US008050830B2

(12) United States Patent
Komeda et al.

(10) Patent No.: US 8,050,830 B2
(45) Date of Patent: Nov. 1, 2011

(54) DRIVING APPARATUS FOR VEHICLE

(75) Inventors: Osamu Komeda, Mishima (JP);
Mitsuhiro Tabata, Suntogun (JP);
Sachio Toyora, Numazu (JP); Hiroshi Sato, Susono (JP); Koji Murakami, Susono (JP); Junichi Morimura, Suntogun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 115 days.

(21) Appl. No.: 12/674,441

(22) PCT Filed: Sep. 26, 2008

(86) PCT No.: PCT/JP2008/067383
§ 371 (c)(1),
(2), (4) Date: Feb. 22, 2010

(87) PCT Pub. No.: WO2009/041553
PCT Pub. Date: Apr. 2, 2009

(65) Prior Publication Data
US 2011/0125353 A1    May 26, 2011

(30) Foreign Application Priority Data

Sep. 27, 2007   (JP) .................... 2007-251645

(51) Int. Cl.
*G06F 7/00* (2006.01)
(52) U.S. Cl. ............. 701/51; 701/54; 701/67; 74/329
(58) Field of Classification Search .......... 701/51, 701/67; 74/329; 477/15, 34
See application file for complete search history.

(56) References Cited

U.S. PATENT DOCUMENTS

| 5,890,392 | A | * | 4/1999 | Ludanek et al. ............. 74/331 |
| 6,712,734 | B1 | | 3/2004 | Loeffler |
| 7,231,843 | B2 | * | 6/2007 | Gumpoltsberger et al. .... 74/329 |
| 7,467,562 | B2 | * | 12/2008 | Nomura et al. ............. 74/331 |

(Continued)

FOREIGN PATENT DOCUMENTS

| DE | 197 45 995 A1 | 9/1998 |
| DE | 198 50 549 | 5/2000 |
| JP | 2002 89594 | 3/2002 |
| JP | 2003 79005 | 3/2003 |

(Continued)

OTHER PUBLICATIONS

Extended European Search Report issued Mar. 14, 2011, in Application No. / Patent No. 08833476.8-2421 / 2192013 PCT/JP2008067383.

*Primary Examiner* — Isam Alsomiri
(74) *Attorney, Agent, or Firm* — Oblon, Spivak, McClelland, Maier & Neustadt, L.L.P.

(57) ABSTRACT

A driving apparatus includes a first transmission mechanism receiving mechanical power from an engine output shaft by a first input shaft, a second transmission mechanism receiving the mechanical power from the engine output shaft and a motor by a second input shaft, and a first clutch capable of engaging the engine output shaft with the first input shaft. When performing cranking of an internal-combustion engine, an ECU selects a gear position of the first transmission mechanism and the second transmission mechanism to reduce speed of the mechanical power received by the second input shaft and transmit the power to the first input shaft, and puts the first clutch into an engaging state. The speed of the mechanical power from the motor is reduced by the first and second transmission mechanisms to increase torque, and power is transmitted to the engine output shaft through the first clutch.

9 Claims, 7 Drawing Sheets

| U.S. PATENT DOCUMENTS | | | |
|---|---|---|---|
| 7,950,302 B2 * | 5/2011 | Burgardt et al. ................ 74/331 |
| 2002/0033059 A1 | 3/2002 | Pels et al. |
| 2002/0104397 A1 | 8/2002 | Bowen |
| 2002/0189397 A1 | 12/2002 | Sakamoto et al. |
| 2005/0139035 A1 | 6/2005 | Lee et al. |
| 2006/0258506 A1 | 11/2006 | Ibamoto et al. |
| 2007/0022835 A1 | 2/2007 | Kilian et al. |
| 2008/0000312 A1 | 1/2008 | Lang et al. |

| FOREIGN PATENT DOCUMENTS | | |
|---|---|---|
| JP | 2003 165385 | 6/2003 |
| JP | 2003 237393 | 8/2003 |
| JP | 2005 147312 | 6/2005 |
| JP | 2005 186931 | 7/2005 |
| JP | 2006 312445 | 11/2006 |
| JP | 2007 55591 | 3/2007 |
| JP | 2008 516827 | 5/2008 |

* cited by examiner

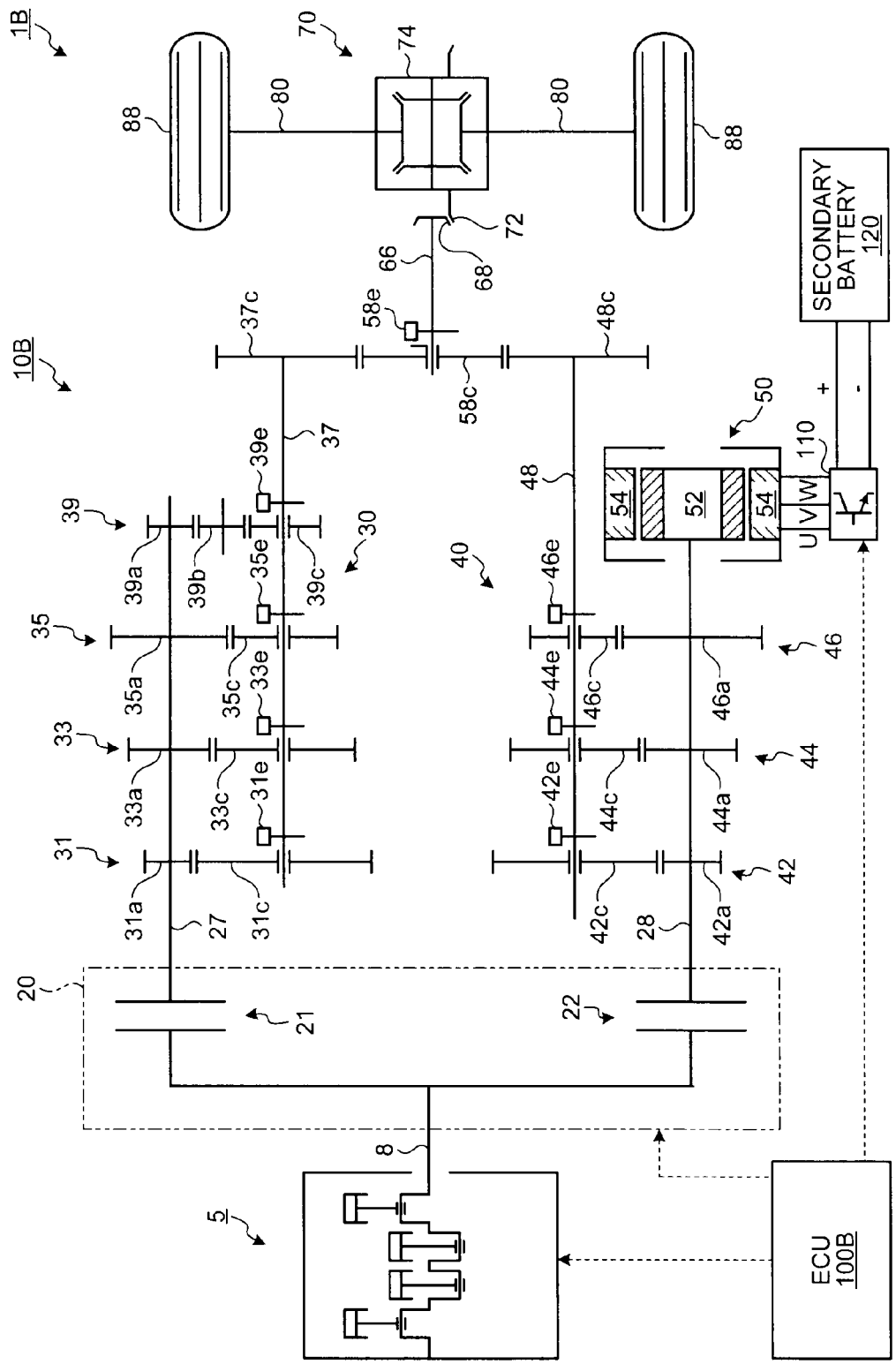

DRIVING APPARATUS FOR VEHICLE

TECHNICAL FIELD

The present invention relates to a driving apparatus used in a vehicle provided with an internal-combustion engine and a motor as prime movers, and in detail, relates to the driving apparatus capable of changing speed of mechanical power from the internal-combustion engine and the motor by a transmission mechanism and transmitting the mechanical power to a vehicle propeller shaft engaging with driving wheels.

BACKGROUND ART

Recently, in order to eliminate break of transmission of the mechanical power when shifting gears, a so-called dual clutch transmission provided with a first clutch capable of engaging an input shaft of a first transmission mechanism composed of odd-number gear positions (hereinafter, referred to as a first input shaft) with an output shaft of the internal-combustion engine (hereinafter, referred to as an engine output shaft), and a second clutch capable of engaging an input shaft of a second transmission mechanism composed of even-number gear positions (hereinafter, referred to as a second input shaft) with the engine output shaft, and shift gears by alternately engaging the two clutches is known as a transmission for the vehicle (for example, refer to Patent Documents 1 to 3).

The dual clutch transmission prevents the break of the power transmission when shifting gears by allowing an even-number gear pair to mesh with each other in advance and putting the first clutch, which transmits the mechanical power to the odd-number position, into a release state, and putting the second clutch, which transmits the mechanical power to the even-number position, into an engaging state, when shifting from the odd-number position to the even-number position, for example.

Also, the following Patent Document 1 discloses the dual clutch transmission (double clutch gear device) provided with the two transmission mechanisms as described above and with an electric motor (second drive unit) engaging with the input shaft (second input shaft) of one transmission mechanism (second gear unit). The Patent Document 1 discloses to perform cranking to start the internal-combustion engine by putting the second clutch into the engaging state and transmitting the mechanical power output from the second drive unit to the second input shaft from the second clutch to the engine. Also, the Patent Document 1 discloses to allow the vehicle to travel by putting the first and second clutches into a non-engaging state (non-fastening state) and output the mechanical power from the second drive unit through the second transmission mechanism (second gear unit).

Also, the following Patent Documents 2 and 3 disclose the vehicle in which first and second motors are connected to the first and second input shafts of the dual clutch transmission, respectively. It is proposed to minimize maximum torque required for the motor by providing the motor on each input shaft.

Patent Document 1: Japanese Patent Application Laid-open No. 2006-312445
Patent Document 2: Japanese Patent Application Laid-open No. 2003-79005
Patent Document 3: U.S. Patent Application Publication No. 2002/0189397 Specification

DISCLOSURE OF INVENTION

Problem to be Solved by the Invention

As in the technique disclosed in the Patent Document 1, when performing the cranking by transmitting the mechanical power output from the second drive unit (electric motor) to the second input shaft from the second clutch to the engine output shaft (engine), rotational speeds of the engine output shaft and the second input shaft are identical, so that it is required that the second drive unit generates relatively high torque required for the cranking of the internal-combustion engine. However, in order to allow the electric motor used as the prime mover (for example, a permanent-magnet alternating-current synchronous electric motor) to generate the torque required for such cranking, it is required to adopt the electric motor having a rotor with large dimension (surface area or the like) and with large maximum output torque.

In addition, it is conventionally known to perform the cranking by rotation-driving the engine output shaft by a DC motor with brush mounted on the internal-combustion engine and engaging with the engine output shaft, a so-called starter motor. However, in such starter motor for the internal-combustion engine, the number of times of starting is limited due to a configuration thereof with the brush. In a hybrid vehicle provided with the internal-combustion engine and the motor as the prime movers, it is required to frequently perform the cranking in order to start the internal-combustion engine during a motor travel and to ensure a brake negative pressure, so that there is a problem of durability of the starter motor to perform all the cranking by using only the starter motor.

Therefore, in the driving apparatus for a vehicle used in the vehicle provided with the internal-combustion engine and the motor as the prime movers and is capable of changing the speed of the mechanical power from the internal-combustion engine and the motor by the transmission mechanism and transmitting the power to the vehicle propeller shaft engaging with the driving wheel, the technique capable of controlling the torque output by the motor provided as the prime mover while preventing the break of the transmission of the mechanical power from the internal-combustion engine to the vehicle propeller shaft when shifting gears of the transmission mechanism, thereby excellently performing the cranking of the internal-combustion engine using the motor is required.

The present invention is achieved in view of the above-described situation, and an object thereof is to provide the driving apparatus for a vehicle capable of controlling the output torque of the motor provided as the prime mover, thereby excellently performing the cranking of the internal-combustion engine using the motor.

Means for Solving Problem

In order to solve the above problems, a driving apparatus for a vehicle, according to the present invention, used in a vehicle provided with an internal-combustion engine and a motor as prime movers and is capable of changing speed of mechanical power from the internal-combustion engine and the motor by a transmission mechanism and transmitting the power to a vehicle propeller shaft engaging with a driving wheel, the driving apparatus includes a first transmission mechanism capable of receiving the mechanical power from an engine output shaft by a first input shaft to change the speed by any one of a plurality of gear positions and transmitting the power to the vehicle propeller shaft; a second transmission mechanism capable of receiving the mechanical power from the engine output shaft and the motor by a second input shaft to change the speed by any one of a plurality of gear positions and transmitting the power to the vehicle propeller shaft; a first clutch capable of engaging the engine output shaft with the first input shaft; a second clutch capable of engaging the engine output shaft with the second input shaft; and controlling means capable of controlling a selection of the gear position in the first transmission mechanism and the second transmission mechanism and an engaging state of the first clutch and the second clutch, wherein the controlling means selects the gear position of the first transmission mechanism and the second transmission mechanism so as to reduce the speed of the mechanical power received by the second input shaft and transmit the power to the first input shaft, and puts the first clutch into an engaging state, when performing cranking of the internal-combustion engine. The speed of the mechanical power output from the motor to the second input shaft is reduced by the second transmission mechanism and the first transmission mechanism, and the power is transmitted from the first input shaft to the engine output shaft through the first clutch.

In the driving apparatus for a vehicle according to the present invention, the cranking of the internal-combustion engine is performed during a motor travel which is a vehicle travel using only the motor as the prime mover, and the controlling means can select the gear position of the first transmission mechanism such that an engine rotational speed when performing the cranking is not lower than a required rotational speed set in advance and is the lowest.

In the driving apparatus for a vehicle according to the present invention, the controlling means includes first-clutch engagement rotational speed estimating means capable of estimating a first clutch engagement rotational speed which is the engine rotational speed when the first clutch is put into the engaging state, for cases in which each of the gear positions of the first transmission mechanism is selected, rotational speed judging means that judges whether the first clutch engagement rotational speed is higher than the required rotational speed set in advance, and gear position selecting means that selects a gear position which is a base of calculation of the first clutch engagement rotational speed in the first transmission mechanism, when the first clutch engagement rotational speed is higher than the required rotational speed, and wherein the rotational speed judging means can judge whether the first clutch engagement rotational speed is higher than the required rotational speed for a highest speed position which is a highest speed gear position, and can judge for a gear position lower than the highest speed position when it is judged to be not higher than the required rotational speed.

In the driving apparatus for a vehicle according to the present invention, the controlling means includes second clutch engagement rotational speed estimating means that estimates a second clutch engagement rotational speed which is the engine rotational speed when the second clutch is put into the engaging state, and the controlling means can put the second clutch into the engaging state to transmit the mechanical power from the motor from the second clutch to the internal-combustion engine, when the second clutch engagement rotational speed is higher than the required rotational speed and lower than the first clutch engagement rotational speed.

The driving apparatus for a vehicle according to the present invention includes a power integration mechanism capable of integrating the mechanical power from the second transmission mechanism and the first transmission mechanism to transmit to the vehicle propeller shaft; and a power shutting mechanism capable of shutting transmission of the mechanical power between the power integration mechanism and the driving wheel, wherein the controlling means can control the power shutting mechanism to shut the transmission of the mechanical power between the power integration mechanism and the driving wheel, when performing the cranking of the internal-combustion engine during vehicle stop.

In the driving apparatus for a vehicle according to the present invention, the controlling means can select a lowest speed gear position out of the gear positions of the second transmission mechanism, and can select a highest speed gear position out of the gear positions of the first transmission mechanism.

In the driving apparatus for a vehicle according to the present invention, the power shutting mechanism can be a clutch mechanism capable of engaging a driving apparatus output shaft coupled to the power integration mechanism with the vehicle propeller shaft.

In the driving apparatus for a vehicle according to the present invention, the power shutting mechanism can be a coupling mechanism capable of engaging the power integration mechanism with the vehicle propeller shaft.

Effect of the Invention

According to the present invention, when performing the cranking of the internal-combustion engine, the controlling means selects the gear position of the first and second transmission mechanisms so as to reduce the speed of the mechanical power received by the second input shaft and transmit the power to the first input shaft, and reduces the speed of the mechanical power output from the motor to the second input shaft by the second and first transmission mechanisms to increase the torque and transmits the power from the first input shaft to the engine output shaft through the first clutch by putting the first clutch into the engaging state. This makes it possible to increase the output torque of the motor provided as the prime mover to rotation-drive the engine output shaft, thereby excellently performing the cranking of the internal-combustion engine while inhibiting the output torque of the motor.

BRIEF DESCRIPTION OF DRAWINGS

FIG. 8 is a schematic diagram showing a schematic configuration of the vehicle provided with a power shutting mechanism of another aspect in the driving apparatus according to the second embodiment.

Figure 1:
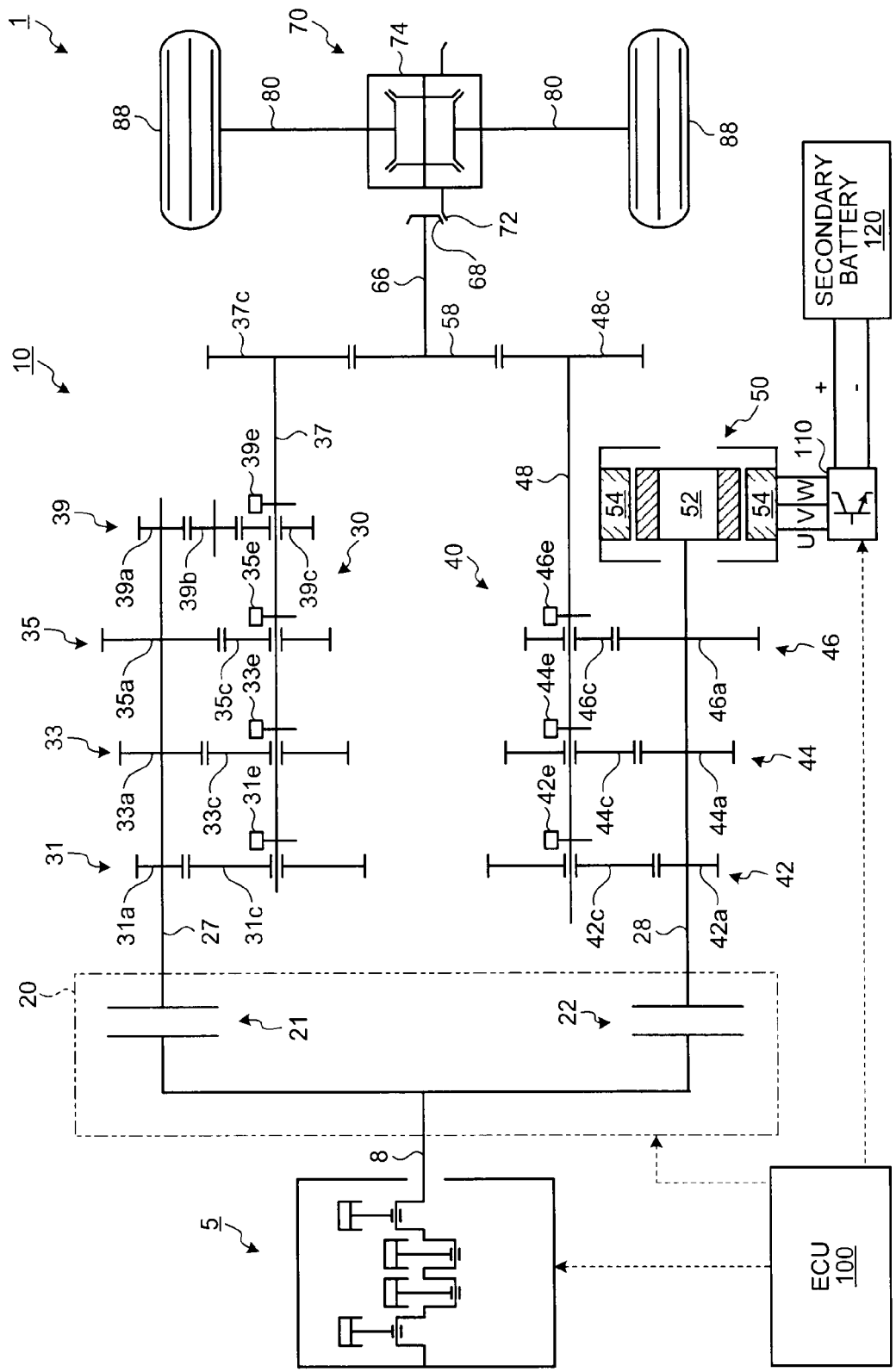
FIG. 1 is a schematic diagram showing a schematic configuration of a vehicle provided with a driving apparatus according to a first embodiment.

EXPLANATIONS OF LETTERS OR NUMERALS 1, 1B vehicle
5 internal-combustion engine
8 engine output shaft
10, 10B driving apparatus
20 dual clutch mechanism
21 first clutch
22 second clutch
27 first input shaft
28 second input shaft
30 first transmission mechanism
31, 33, 35, 39 gear position (shift position)
37 first output shaft
48 second output shaft
40 second transmission mechanism
42, 44, 46 gear position (shift position)
50 motor (motor generator)
52 rotor
58, 58c power integration gear (power integration mechanism)
58a driving apparatus output shaft
58e coupling mechanism
66 vehicle propeller shaft
70 final reduction gear
80 drive shaft
88 driving wheel
90 output side clutch (power shutting mechanism)
100, 100B electronic control unit (ECU, controlling means, first clutch engagement rotational speed estimating means, second clutch engagement rotational speed estimating means, rotational speed judging means, gear position selecting means)

BEST MODE(S) FOR CARRYING OUT THE INVENTION

Hereinafter, an embodiment according to the present invention is described in detail with reference to drawings. Meanwhile, the present invention is not limited by this embodiment.

First Embodiment

First, a schematic configuration of a hybrid vehicle to which a driving apparatus according to this embodiment is applied and the driving apparatus is described with reference to FIG. 1. FIG. 1 is a schematic diagram showing the schematic configuration of the vehicle provided with the driving apparatus.

A vehicle 1 according to this embodiment is a so-called hybrid vehicle provided with an internal-combustion engine 5 and a motor 50 as prime movers for rotation-driving a driving wheel 88. The motor 50 is included in a driving apparatus 10 for changing speed of mechanical power from the internal-combustion engine 5 and transmitting the power to a vehicle propeller shaft 66. The internal-combustion engine 5 is coupled to the driving apparatus 10 provided with the motor 50 and is mounted on the vehicle 1.

The internal-combustion engine 5 is provided with a fuel injection device, an ignition device, and a throttle valve device, which are not shown. These devices are controlled by an electronic control unit 100 (hereinafter, referred to as an ECU) provided as controlling means for controlling the driving apparatus 10 to be described later. The mechanical power generated by the internal-combustion engine 5 is output from an output shaft (crankshaft) 8. An input side of a clutch mechanism 20 of the driving apparatus 10 to be described later, such as a clutch housing 14a (refer to FIG. 2) is coupled to the output shaft 8 of the internal-combustion engine 5 (hereinafter, referred to as a mechanical output shaft). The ECU 100 is capable of adjusting the mechanical power output from the output shaft 8 of the internal-combustion engine 5 (hereinafter, referred to as the mechanical output shaft). Meanwhile, a crank angle sensor not shown for detecting a rotation angle position (hereinafter, referred to as a crank angle) of the engine output shaft 8 is provided on the internal-combustion engine 5 to transmit a signal relating to the crank angle to the ECU 100.

Meanwhile, a starter motor (not shown) is mounted on the internal-combustion engine 5 for rotation-driving the engine output shaft 8. The starter motor is composed of a DC motor with brush and is controlled by the ECU 100. The ECU 100 is capable of performing cranking by rotation-driving the engine output shaft 8 by the starter motor at the time of a vehicle stop and a cold start.

Also, the driving apparatus 10 capable of changing the speed of the mechanical power from the engine output shaft 8 and the motor 50 and changing torque to transmit to the vehicle propeller shaft 66, and a final reduction gear 70 for reducing the speed of mechanical power transmitted from the prime mover to the vehicle propeller shaft 66 and distributing the power to right and left driving shafts 80, which engage with the driving wheels 88, are provided on the vehicle 1, as power transmission devices for changing the speed of the mechanical power from the internal-combustion engine 5 and the motor 50 as the prime movers and transmitting the power to the driving wheels 88.

The driving apparatus 10 has a dual clutch mechanism 20 for transmitting the mechanical power from the internal-combustion engine 5 to a transmission mechanism to be described later by using any of first and second clutches 21 and 22, a first transmission mechanism 30 capable of receiving the mechanical power transmitted from the internal-combustion engine 5 through the first clutch 21 by a first input shaft 27 and changing the speed thereof by any one of first group gear positions to transmit from the first output shaft 37 to the vehicle propeller shaft 66, and a second transmission mechanism 40 capable of receiving the mechanical power transmitted from the internal-combustion engine 5 through the second clutch 22 by a second input shaft 28 and changing the speed thereof by any one of second group gear positions to transmit from the second output shaft 48 to the vehicle propeller shaft 66.

The first and second transmission mechanisms 30 and 40 have six forward gear positions, which are first gear position 31 to sixth gear position 46, and one reverse gear position 39. Reduction ratios of the first to sixth gear positions 31 to 46, which are the forward gear positions, are set so as to be smaller in the order from the first gear position 31, the second gear position 42, the third gear position 33, the fourth gear position 44, the fifth gear position 35, and the sixth gear position 46.

The first transmission mechanism 30 is configured as a parallel shaft gear device provided with a plurality of gear pairs, and the first group gear positions are composed of odd-number positions, that is to say, the first gear position 31, the third gear position 33 and the fifth gear position 35, and the reverse gear position 39. The fifth gear position 35 out of the forward gear positions 31, 33 and 35 of the first transmission mechanism 30 is the highest speed gear position (highest speed position).

The first gear position 31 has a first main gear 31a coupled to the first input shaft 27, a first counter gear 31c provided so as to be rotatable around the first output shaft 37 to mesh with the first main gear 31a, and a first coupling mechanism 31e capable of engaging the first counter gear 31c with the first output shaft 37.

When the ECU 100 selects the first gear position 31, that is to say, puts the first coupling mechanism 31e into an engaging state to engage the first counter gear 31c with the first output shaft 37, the mechanical power from the first input shaft 27 is transmitted to the first output shaft 37 through the first main gear 31a and the first counter gear 31c. This makes it possible that the first transmission mechanism 30 changes the speed of the mechanical power received from the first input shaft 27 by the first gear position 31 and changes the torque to transmit to the first output shaft 37.

The third gear position 33, as well as the first gear position 31, has a third main gear 33a coupled to the first input shaft 27, a third counter gear 33c provided so as to be rotatable around the first output shaft 37 to mesh with the third main gear 33a, and a third coupling mechanism 33e capable of engaging the third counter gear 33c with the first output shaft 37.

When the ECU 100 selects the third gear position 31, that is to say, puts the third coupling mechanism 33e into the engaging state to engage the third counted gear 33c with the first output shaft 37, the first transmission mechanism 30 can change the speed of the mechanical power received from the first input shaft 27 by the third gear position 33 and change the torque to transmit to the first output shaft 37.

Also, the fifth gear position 35 has a fifth main gear 35a coupled to the first input shaft 27, a fifth counter gear 35c provided so as to be rotatable around the first output shaft 37 to mesh with the fifth main gear 35a, and a fifth coupling mechanism 35e capable of engaging the fifth counter gear 35c with the first output shaft 37.

When the ECU 100 selects the fifth gear position 35, that is to say, puts the fifth coupling mechanism 35e into the engaging state to engage the fifth counter gear 35c with the first output shaft 37, the first transmission mechanism 30 can change the speed of the mechanical power received from the first input shaft 27 by the fifth gear position 35 and change the torque to transmit to the first output shaft 37.

Also, the reverse gear position 39 has a reverse main gear 39a coupled to the first input shaft 27, a reverse intermediate gear 39b meshing with the reverse main gear 39a, a reverse counter gear 39c meshing with the reverse intermediate gear 39b and provided so as to be rotatable around the first output shaft 37, and a reverse coupling mechanism 39e capable of engaging the reverse counter gear 39c with the first output shaft 37.

When the ECU 100 selects the reverse gear position 39, that is to say, puts the reverse coupling mechanism 39e into the engaging state to engage the reverse counter gear 39c with the first output shaft 37, the first transmission mechanism 30 can change the speed of the mechanical power received from the first input shaft 27 by the reverse gear position 39 while changing a rotational direction thereof to an opposite direction and changing the torque to transmit to the first output shaft 37.

Switching of the engaging state and a non-engaging state (release state) of each of the coupling mechanisms 31e, 33e, 35e and 39e in the first transmission mechanism 30 is controlled by the ECU 100 through an actuator not shown. The ECU 100 selects any one gear position out of each of the gear positions 31, 33, 35 and 39 of the first transmission mechanism 30 to put the coupling mechanism corresponding to the selected gear position into the engaging state. This makes it possible that the first transmission mechanism 30 changes the speed of the mechanical power, which the first input shaft 27 receives from the engine output shaft 8 of the internal-combustion engine 5, by any one of the gear positions (odd-number positions) 31, 33, 35 and 39 and changes the torque to output from the first output shaft 37.

In the first transmission mechanism 30, a first propeller shaft drive gear 37c is coupled to the first output shaft 37, and the gear 37c meshes with a power integration gear 58 coupled to the vehicle propeller shaft 66. This makes it possible that the first transmission mechanism 30 transmits the mechanical power transmitted from the first input shaft 27 to the first output shaft 37 from the first propeller shaft drive gear 37c to the vehicle propeller shaft 66 through the power integration gear 58.

On the other hand, the second transmission mechanism 40, as well as the first transmission mechanism 30, is configured as the parallel shaft gear device provided with a plurality of gear pairs, and the second group gear positions are composed of even-number positions, that is to say, the second gear position 42, the fourth gear position 44 and the sixth gear position 46. The second gear position 42 out of the gear positions 42, 44 and 46 of the second transmission mechanism 40 is the lowest speed gear position.

The second gear position 42 has a second main gear 42a coupled to the second input shaft 28, a second counter gear 42c provided so as to be rotatable around the second output shaft 48 to mesh with the second main gear 42a, and a second coupling mechanism 42e capable of engaging the second counter gear 42c with the second output shaft 48.

When the ECU 100 selects the second gear position 42, that is to say, puts the second coupling mechanism 42e into the engaging state to engage the second counter gear 42c with the second output shaft 48, the mechanical power from the second input shaft 28 is transmitted to the second output shaft 48 through the second main gear 42a and the second counter gear 42c. This makes it possible that the second transmission mechanism 40 changes the speed of the mechanical power received from the second input shaft 28 by the second gear position 42 and changes the torque to transmit to the second output shaft 48.

The fourth gear position 44 has a fourth main gear 44a coupled to the second input shaft 28, a fourth counter gear 44c provided so as to be rotatable around the second output shaft 48 and meshing with the fourth main gear 44a, and a fourth coupling mechanism 44e capable of engaging the fourth counter gear 44c with the second output shaft 48.

When the ECU 100 selects the fourth gear position 44, that is to say, puts the fourth coupling mechanism 44e into the engaging state to engage the fourth counter gear 44c with the second output shaft 48, the second transmission mechanism 40 can change the speed of the mechanical power received from the second input shaft 28 by the fourth gear position 44 and change the torque to transmit to the second output shaft 48.

Also, the sixth gear position 46 has a sixth main gear 46a coupled to the second input shaft 28, a sixth counter gear 46c provided so as to be rotatable around the second output shaft 48 and meshing with the sixth main gear 46a, and a sixth coupling mechanism 46e capable of engaging the sixth counter gear 46c with the second output shaft 48.

When the ECU 100 selects the sixth gear position 46, that is to say, puts the sixth coupling mechanism 46e into the engaging state to engage the sixth counter gear 46*c* with the second output shaft 48, the second transmission mechanism 40 can change the speed of the mechanical power received from the second input shaft 28 by the sixth gear position 46 and change the torque to transmit to the second output shaft 48.

Switching of the engaging state and the non-engaging state (release state) of each of the coupling mechanisms 42*e*, 44*e* and 46*e* in the second transmission mechanism 40 is controlled by the ECU 100 through an actuator not shown. The ECU 100 selects any one gear position of each of the gear positions 42, 44 and 46 of the second transmission mechanism 40 to put the coupling mechanism 42*e*, 44*e* or 46*e* corresponding to the selected gear position into the engaging state. This makes it possible that the second transmission mechanism 40 changes the speed of the mechanical power, which the second input shaft 28 receives from the engine output shaft 8 of the internal-combustion engine 5 and a rotor 52 of the motor 50, by any one of the gear positions (even-number positions) 42, 44 and 46 and changes the torque to output from the second output shaft 48.

A second propeller shaft drive gear 48*c* is coupled to the second output shaft 48, and the second propeller shaft drive gear 48*c* meshes with the power integration gear 58 coupled to the vehicle propeller shaft 66. The first transmission mechanism 30 is capable of transmitting the mechanical power transmitted from the second input shaft 28 to the second output shaft 48 from the second propeller shaft drive gear 48*c* to the vehicle propeller shaft 66 through the power integration gear 58. The mechanical power output by the second transmission mechanism 40 from the second output shaft 48 is integrated with the mechanical power output by the first transmission mechanism 30 from the first output shaft 37 in the power integration gear 58 and transmitted to the vehicle propeller shaft 66.

In addition, the motor 50 as the prime mover is provided on the driving apparatus 10. The motor 50 is a rotating electrical machine obtained by combining a function as an electric motor for converting supplied electric power into the mechanical power to output and a function as an electric generator for converting the input mechanical power into the electric power, a so-called, motor generator. The motor 50 is composed of a permanent-magnet alternating-current synchronous electric motor, and has a stator 54 for being supplied with (three-phase) alternating-current power by an inverter 110 to be described later to form a rotating magnetic field, and the rotor 52 pulled by the rotating magnetic field to rotate. The rotor 52 is coupled to the second input shaft 28, and the mechanical power generated by the motor 50 is output to the second input shaft 28 of the second transmission mechanism 40. Also, the motor 50 can also convert the mechanical power transmitted from the second output shaft 48 to the rotor 52 into the alternating-current power. The motor 50 is controlled by the ECU 100 through the inverter 110 to be described later.

Also, the inverter 110 is provided on the driving apparatus 10 as a power supply device for supplying the alternating-current power to the motor 50. The inverter 110 is configured so as to be able to convert direct-current power supplied from the secondary battery 120 into the alternating-current power to supply to the motor 50. Also, the inverter 110 is also configured so as to be able to convert the alternating-current power from the motor 50 into the direct-current power and recover the same into the secondary battery 120. Such supply of the electric power from the inverter 110 to the motor 50 and the recovery of the electric power from the motor 50 are controlled by the ECU 100.

The ECU 100 is capable of switching the functions as the electric motor/electric generator of the motor 50 and adjusting the torque output from the rotor 52 of the motor 50 to the second input shaft 28 of the second transmission mechanism 40 through the inverter 110. Meanwhile, in the following description, the output of the mechanical power (torque) from the rotor 52 of the motor 50 is referred to as "power running". That is to say, the power running of the motor 50 is controlled by the ECU 100.

Also, a dual clutch mechanism 20 is provided on the driving apparatus 10 as power transmitting means for transmitting the mechanical power from the engine output shaft 8 of the internal-combustion engine 5 to any one of the first and second transmission mechanisms 30 and 40. The dual clutch mechanism 20 has the first clutch 21 capable of engaging the engine output shaft 8 with the first input shaft 27 of the first transmission mechanism 30 and the second clutch 22 capable of engaging the engine output shaft 8 with the second input shaft 28 of the second transmission mechanism 40.

The first clutch 21 has a disk-shaped friction plate and is composed of a friction disk clutch or the like for transmitting the mechanical power by frictional force of the friction plate. The first clutch 21 is configured so as to be able to engage the engine output shaft 8 of the internal-combustion engine 5 and the first input shaft 27 of the first transmission mechanism 30. By putting the first clutch 21 into the engaging state, the engine output shaft 8 and the first input shaft 27 can engage with each other to integrally rotate.

The second clutch 22, as well as the first clutch 21, is composed of the friction disk clutch or the like, and is configured to be able to engage the engine output shaft 8 of the internal-combustion engine 5 with the second input shaft 28 of the second transmission mechanism 40. By putting the second clutch 22 into the engaging state, the engine output shaft 8 and the second input shaft 28 may engage with each other to integrally rotate. Meanwhile, a wet multiple-disk clutch and a dry single-disk clutch may be used as the first and second clutches 21 and 22.

Switching of the engaging state and the non-engaging state (release state) of the first and second clutches 21 and 22 is controlled by the ECU 100 through an actuator not shown. The ECU 100 is capable of transmitting the mechanical power from the internal-combustion engine 5 to the vehicle propeller shaft 66 through any one of the first and second transmission mechanisms 30 and 40, by putting any one of the first and second clutches 21 and 22 into the engaging state and putting the other into the release state in the dual clutch mechanism 20.

Figure 2:
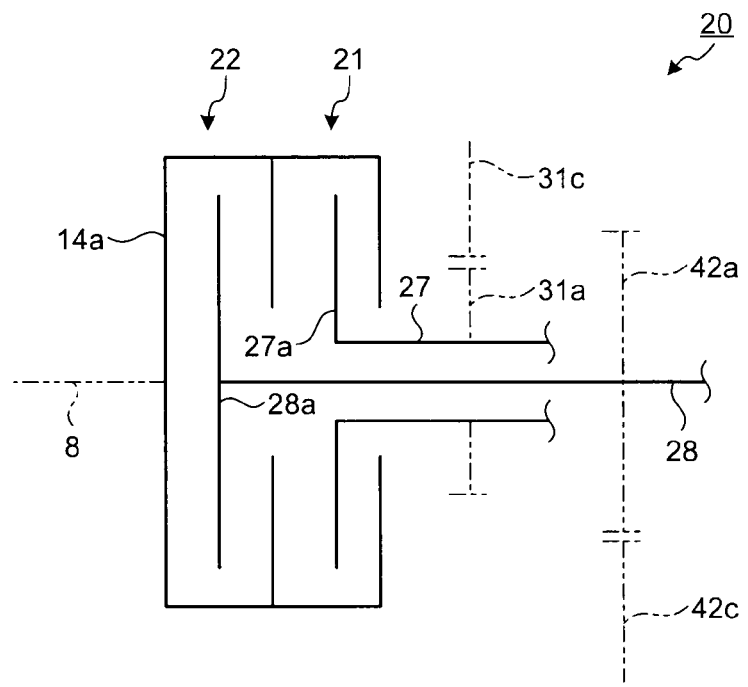
FIG. 2 is a schematic diagram for illustrating a configuration of a dual clutch mechanism of the driving apparatus according to the first embodiment.
Figure 3:
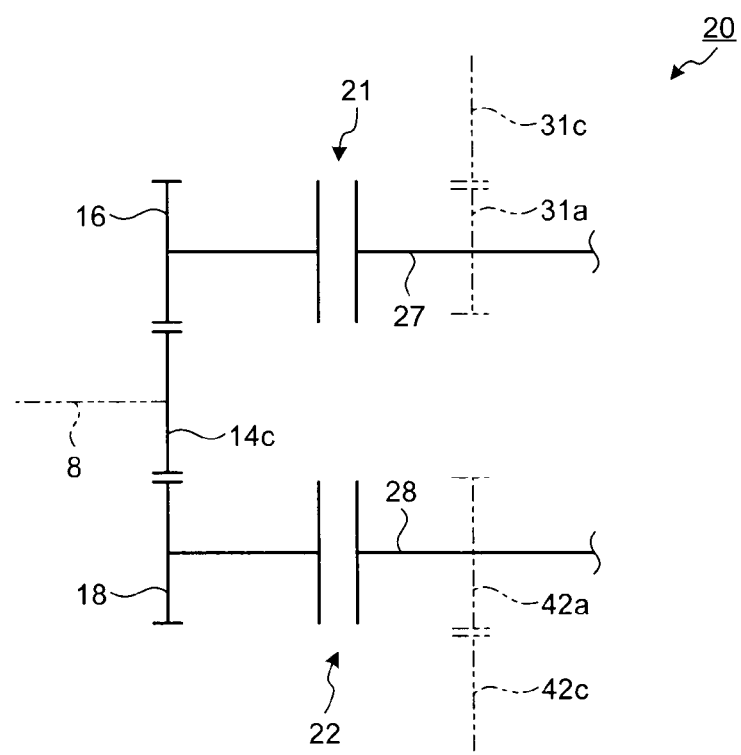
FIG. 3 is a schematic diagram for illustrating a configuration of a dual clutch mechanism of another aspect in the driving apparatus according to the first embodiment.

Herein, a configuration of the dual clutch mechanism 20 composed of the first and second clutches 21 and 22 is described with reference to FIGS. 2 and 3. FIG. 2 is a schematic diagram for illustrating the configuration of the dual clutch mechanism. FIG. 3 is a schematic diagram for illustrating the configuration of the dual clutch mechanism of another aspect.

As shown in FIG. 2, in the dual clutch mechanism 20, a clutch housing 14*a* of the dual clutch mechanism 20 is coupled to the engine output shaft 8. That is to say, the clutch housing 14*a* rotates integrally with the engine output shaft 8. The clutch housing 14*a* is configured so as to be able to accommodate friction plates 27*a* and 28*a* to be described later. On the other hand, the first input shaft 27 of the first transmission mechanism 30 and the second input shaft 28 of the second transmission mechanism 40 are coaxially arranged and form a double shaft configuration. Specifically, the first input shaft 27 is configured as a hollow shaft and the second input shaft 28 extends within the first input shaft 27.

The second input shaft 28, which is an inner shaft, is formed so as to be longer than the first input shaft 27, which is an outer shaft. From the engine output shaft 8 side toward the vehicle propeller shaft 66 side, first, the main gears 31a, 33a, 35a and 39a of each gear position of the first transmission mechanism 30 are arranged, and next, the main gears 42a, 44a and 46a of each gear position of the second transmission mechanism 40 are arranged.

The disk-shaped friction plate 27a is coupled to an end of the first input shaft 27, and on the other hand, the friction plate 28a is similarly coupled to an end of the second input shaft 28, too. The friction plates 27a and 28a are accommodated in the above-described clutch housing 14a. The first clutch 21 has a friction mating plate (not shown) provided so as to be opposed to the friction plate 27a and an actuator (not shown) for driving the friction mating plate. The friction mating plate presses the friction plate 27a against the clutch housing 14a, thereby enabling the first clutch 21 to engage the engine output shaft 8 with the first input shaft 27 of the first transmission mechanism 30.

Similarly, the friction mating plate (not shown) provided so as to be opposed to the friction plate 28a presses the friction plate 28a against the clutch housing 14a, thereby enabling the second clutch 22 to engage the engine output shaft 8 with the second input shaft 28 of the second transmission mechanism 40. Driving of the friction mating plates provided so as to correspond to the first and second clutches 21 and 22, respectively, in the dual clutch mechanism 20 is controlled by the ECU 100.

Also, in the dual clutch mechanism 20 of another aspect according to this embodiment, as shown in FIG. 3, a drive gear 14c is coupled to an end of the engine output shaft 8. First and second gears 16 and 18 mesh with the drive gear 14c, the first gear 16 coupled to the first clutch 21 and the second gear 18 coupled to the second clutch 22. The first clutch 21 is configured so as to be able to engage the first input shaft 27 of the first transmission mechanism 30 with the first gear 16 engaging with the engine output shaft 8. On the other hand, the second clutch 22 is configured so as to be able to engage the second input shaft 28 of the second transmission mechanism 40 with the second gear 18 engaging with the engine output shaft 8.

Each of the first and second clutches 21 and 22 can be composed of an optional clutch such as the disk-shaped friction clutch. By alternately switching the engaging state and release state in the first and second clutches 21 and 22, the mechanical power of the internal-combustion engine 5 output from the engine output shaft 8 is transmitted from the drive gear 14 to the first input shaft 27 of the first transmission mechanism 30 or the second input shaft 28 of the second transmission mechanism 40.

In the dual clutch mechanism 20 thus configured, as shown in FIG. 1, when the ECU 100 puts the first clutch 21 into the engaging state and puts the second clutch 22 into the release state, the engine output shaft 8, the first input shaft 27, the first output shaft 37, the power integration gear 58, and the vehicle propeller shaft 66 engage with one another. This makes it possible that the driving apparatus 10 changes the speed of the mechanical power from the internal-combustion engine 5 by any one of the gear positions 31, 33, 35 and 39 of the first transmission mechanism 30 and transmits the power to the vehicle propeller shaft 66.

On the other hand, when the ECU 100 puts the second clutch 22 into the engaging state and puts the first clutch 21 into the release state, the engine output shaft 8, the second input shaft 28, the second output shaft 48, and the vehicle propeller shaft 66 engage with one another. This makes it possible that the driving apparatus 10 changes the speed of the mechanical power from the internal-combustion engine 5 by any one of the gear positions 42, 44 and 46 of the second transmission mechanism 40 and transmits the power to the vehicle propeller shaft 66.

Also, the final reduction gear 70 for reducing the speed of the mechanical power transmitted from the prime mover to the vehicle propeller shaft 66 and distributing the power to the right and left drive shafts 80 engaging with the driving wheels 88 is provided on the vehicle 1. The final reduction gear 70 has a drive pinion 68 coupled to the vehicle propeller shaft 66, a ring gear 72 orthogonal to the drive pinion 68 to mesh with the same, and a differential mechanism 74 fixed to the ring gear 72. The final reduction gear 70 is capable of reducing the speed of the mechanical power transmitted from the prime mover, that is to say, at least one of the internal-combustion engine 5 and the motor 50 to the vehicle propeller shaft 66, by the drive pinion 68 and the ring gear 72, and distributing the power to the right and left drive shafts 80 by the differential mechanism 74 to rotation-drive the driving wheels 88. In this manner, the vehicle propeller shaft 66 engages with the driving wheels 88 through the final reduction gear 70 and rotates according to the speed of the vehicle 1.

Also, the above-descried electronic control unit (ECU) 100 is provided on the vehicle 1 as the controlling means for controlling the driving apparatus 10. The ECU 100 is configured so as to be able to select the gear position in the first and second transmission mechanisms 30 and 40, and to control the engaging state of the first and second clutches 21 and 22 and the mechanical power output by the motor 50, in synchronization with the internal-combustion engine 5, based on various signals to be described below and various control variables calculated from the signals.

The ECU 100 is capable of detecting a signal relating to the crank angle from the crank angle sensor of the internal-combustion engine 5, a signal relating to an inhaled air amount of the internal-combustion engine 5 from an air flow meter (not shown), a signal relating to an operational amount of an accelerator pedal (hereinafter, referred to as an accelerator operational amount) by a driver from an accelerator pedal position sensor. Also, the ECU 100 is capable of detecting a signal relating to a storage state of the secondary battery 120 (state of charge of electric energy, SOC), a signal relating to a negative pressure for brake booster of the vehicle 1 (hereinafter, referred to as a brake negative pressure), a signal relating to the rotational speed of the driving wheels 88, and a signal relating to the rotational speed of the rotor 52 of the motor 50. Further, the ECU 100 is capable of detecting a signal relating to the engaging state of the gear position, that is to say, the coupling mechanisms 31e to 46e, selected in the first and second transmission mechanisms 30 and 40, and a signal relating to the engaging state or the release state of the first and second clutches 21 and 22.

The ECU 100 calculates the rotational speed of the engine output shaft 8 of the internal-combustion engine 5 (hereinafter, referred to as an engine rotational speed) from the signal relating to the detected crank angle. Also, the ECU 100 calculates the torque output by the internal-combustion engine 5 from the engine output shaft 8 (hereinafter, referred to as an engine load) from the calculated engine rotational speed and the detected signal relating to the inhaled air amount. Also, the ECU 100 calculates vehicle driving force required for the vehicle 1 from the detected signal relating to the accelerator operational amount. Further, the ECU 100 calculates a travel speed of the vehicle 1 (hereinafter, referred to as a vehicle speed) from the detected rotational speed of the driving wheels 88. Meanwhile, the ECU 100 can also calculate the travel speed of the vehicle 1 (hereinafter, referred to as the vehicle speed) from the detected signal relating to the rotational speed of the rotor 52, and information relating to the engaging state of the gear position, that is to say, each of the coupling mechanisms 42e, 44e and 46e selected in the second transmission mechanism 40.

The vehicle 1 thus configured prevents a break of the power transmission between the engine output shaft 8 and the vehicle propeller shaft 66 when shifting gears, by alternately switching to engage the first and second clutches 21 and 22, and this is hereinafter described.

First, the ECU 100 selects any one of the gear positions 31 to 46 of the first and second transmission mechanisms 30 and 40. For example, when the selected gear position is the first gear position 31 out of the first group (odd-number) gear positions 31 to 39 of the first transmission mechanism 30, the ECU 100 puts the first coupling mechanism 31e corresponding to the first gear position 31 into the engaging state and puts the coupling mechanisms 33e and 35e into the release state. At the same time, the ECU 100 puts the first clutch 21 into the engaging state and puts the second clutch 22 into the release state. Thereby, the driving apparatus 10 can receive the mechanical power from the internal-combustion engine 5 by the first input shaft 27, and change the speed thereof by the first gear position 31, which is the gear position selected from the first group (odd-number) gear positions 31 to 39, to transmit from the first output shaft 37 to the vehicle propeller shaft 66, thereby rotation-driving the driving wheels 88.

At that time, the ECU 100 puts the second coupling mechanism 42e corresponding to the second gear position 42, which is the gear position higher than the first gear position 31 selected in the first transmission mechanism 30 by one gear position (high gear), into the engaging state out of the second group (even-number) gear positions 42, 44 and 46 of the second transmission mechanism 40, thereby allowing the second input shaft 28 of the second transmission mechanism 40 to idle to provide for engaging operation of the second clutch 22 when shifting (upshifting) to the next second gear position 42.

Then, when gear shift (upshift) to the second gear position 42, which is the second group (even-number) gear positions of the second transmission mechanism 40, is selected, the ECU 100 puts the second clutch 22 into the engaging state while putting the first clutch 21 into the release state, thereby the driving apparatus 10 performs operation to switch the first and second clutches 21 and 22 to be clutched, a so-called "clutch-to-clutch". By this operation, the driving apparatus 10 shifts a power transmission path from the engine output shaft 8 gradually from the first input shaft 27 of the first transmission mechanism 30 to the second input shaft 28 of the second transmission mechanism 40, and the shift to the second gear position 42 is completed.

In this manner, the driving apparatus 10 is capable of shifting without generating the break of the power transmission from the engine output shaft 8 to the vehicle propeller shaft 66 when shifting from the first gear position 31, which is the odd-number position, to the second gear position 42, which is the even-number position.

Also, the vehicle 1 thus configured is the so-called "hybrid vehicle" capable of using the internal-combustion engine 5 and the motor 50 together or selectively using them as the prime mover, and may realize various vehicle travels (travel modes). For example, there are an "engine travel" to selectively use only the internal-combustion engine 5 as the prime mover, an "HV travel" to use the internal-combustion engine 5 and the motor 50 together as the prime movers, a "motor travel" to selectively use only the motor 50 as the prime mover, and the like. The vehicle travels are sequentially automatically switched by the ECU 100 according to the vehicle driving force required by the driver and the storage state of the secondary battery 120, which stores the electric power to be supplied to the motor 50. Hereinafter, the control of the ECU 100 in each travel mode, and operation of the internal-combustion engine 5, the first and second clutches 21 and 22, the first and second transmission mechanisms 30 and 40, and the motor 50 are described.

When the ECU 100 puts the second clutch 22 into the release state while putting the first clutch 21 into the engaging state, the driving apparatus 10 may receive the mechanical power from the engine output shaft 8 of the internal-combustion engine 5 by the first input shaft 27, and change the speed thereof by any one of the gear positions 31, 33, 35 and 39 of the first transmission mechanism 30, to transmit from the first output shaft 37 to the vehicle propeller shaft 66, thereby rotation-driving the driving wheels 88. In this manner, the vehicle 1 can realize the "engine travel" to selectively use only the internal-combustion engine 5 as the prime mover.

In this case, the second output shaft 48 engages with the vehicle propeller shaft 66 through the power integration gear 58, so that when any one of the coupling mechanisms 42e, 44e and 46e of the second transmission mechanism 40 is in the engaging state, the second input shaft 28 and the rotor 52 engaging with the same rotate according to the travel speed of the vehicle 1 (hereinafter, referred to as the vehicle speed).

At that time, when the ECU 100 allows the motor 50 to perform the power running to transmit output torque from the rotor 52 to the second input shaft 28, the driving apparatus 10 can change the speed of the mechanical power from the internal-combustion engine 5 and the mechanical power from the motor 50 by the first and second transmission mechanisms 30 and 40, respectively, and integrate them by the power integration gear 58 to transmit to the vehicle propeller shaft 66. In this manner, the vehicle 1 can realize the "HV travel" to use the internal-combustion engine 5 and the motor 50 together as the prime movers.

Also, when the ECU 100 puts the first clutch 21 into the release state and puts the second clutch 22 into the engaging state, the driving apparatus 10 may receive the mechanical power from the engine output shaft 8 by the second input shaft 28, and change the speed thereof by any one of the gear positions 42, 44 and 46 of the second transmission mechanism 40 to transmit from the second output shaft 48 to the vehicle propeller shaft 66, thereby rotation-driving the driving wheels 88, and the vehicle 1 can realize the "engine travel" to selectively use only the internal-combustion engine 5 as the prime movers.

In this case, the first output shaft 37 engages with the vehicle propeller shaft 66 through the power integration gear 58, so that when any one of the coupling mechanisms 31e, 33e, 35e and 39e of the first transmission mechanism 30 is in the engaging state, the first input shaft 27 rotates according to the travel speed of the vehicle 1 (hereinafter, referred to as the vehicle speed).

At that time, when the ECU 100 allows the motor 50 to perform the power running to transmit the output torque from the rotor 52 to the second input shaft 28, the driving apparatus 10 can integrate the mechanical power from the internal-combustion engine 5 and the mechanical power from the motor 50 by the second input shaft 28, and change the speed thereof by the second transmission mechanism 40 to transmit to the vehicle propeller shaft 66 through the power integration gear 58, and the vehicle 1 can realize the "HV travel" to use the internal-combustion engine 5 and the motor 50 together as the prime movers.

On the other hand, when allowing the vehicle 1 to perform the motor travel, unlike the control of the above-described engine travel and the HV travel, the ECU 100 controls both of the first and second clutches 21 and 22 in the release state and allows the motor 50 to perform the power running. The ECU 100 selects any one of the gear positions 42, 44 and 46 of the second transmission mechanism 40 and puts the coupling mechanism corresponding to the gear position into the engaging state. The driving apparatus 10 receives the mechanical power from the motor 50 by the second input shaft 28, and changes the speed thereof by the gear position selected from the gear positions 42, 44 and 46 of the second transmission mechanism 40 to transmit from the second output shaft 48 to the vehicle propeller shaft 66.

During the motor travel of such vehicle 1, since the ECU 100 puts both of the first and second clutches 21 and 22 into the release state, power loss such as pumping loss of the internal-combustion engine 5 is prevented from occurring due to the rotation-driving of the engine output shaft 8 of the internal-combustion engine 5 in a non-operational state by the power running of the motor 5.

As described above, the vehicle 1 according to this embodiment is provided with the internal-combustion engine 5 and the motor 50 as the prime mover, and is capable of propelling the vehicle 1 by using the internal-combustion engine 5 and the motor 50 together or selectively using them. The vehicle 1 is capable of rotation-driving the engine output shaft 8 of the internal-combustion engine 5 in the non-operational state, thereby performing firing to start the internal-combustion engine 5 and generating the negative pressure to be used in the brake booster or the like by the internal-combustion engine 5 without performing the firing. Meanwhile, to rotation-drive the engine output shaft 8 of the internal-combustion engine 5 in the non-operational state by external power is referred to as "cranking" in a following description.

Such vehicle 1 might perform the vehicle travel while putting the internal-combustion engine 5 into the non-operational state, so that the number of times to start the internal-combustion engine 5 is larger than in a so-called "general vehicle" provided with only the internal-combustion engine 5 as the prime mover, and frequency of performing the cranking is high. Also, in the hybrid vehicle 1, a time period in which the internal-combustion engine 5 is in the operational state is short in the time period in which the vehicle 1 travels, so that this might perform the cranking without performing the firing of the internal-combustion engine 5 in order to ensure the negative pressure for the brake booster or the like, unlike the case of the general vehicle.

In this manner, if the frequency of performing the cranking of the internal-combustion engine 5 is high in the vehicle 1, when performing the cranking of the internal-combustion engine 5 during the vehicle travel by the DC motor with brush, the so-called starter motor, mounted on the internal-combustion engine 5, there is a possibility that a problem of durability of the starter motor occurs. Also, the cranking of the internal-combustion engine 5 during the vehicle travel is automatically performed and is not predicted by a crew of the vehicle, so that there is a problem that operating noise of the starter motor is disagreeable to ears of the crew of the vehicle when performing the cranking by the starter motor during the vehicle travel.

Therefore, during the vehicle travel, it is required that the cranking of the internal-combustion engine 5 is performed by utilizing the mechanical power not from the starter motor, which is the DC motor with brush, but from the motor 50 coupled to the second input shaft 28 of the second transmission mechanism 40, for rotation-driving the vehicle propeller shaft 66. However, the motor 50 is a motor generator for rotation-driving the vehicle propeller shaft 66 and is composed of the permanent-magnet alternating-current synchronous motor or the like. The motor 50 does not output high torque in a short time period unlike the DC motor with brush (starter motor).

In order to transmit the mechanical power output by the motor 50 from the second input shaft 28 to the engine output shaft 8 through the second clutch 22 to perform the cranking, it is required to allow the motor 50 to output the high torque. In order to realize this, it is required to use the rotating electrical machine of which rotor 52 has a large surface area, that is to say, large dimension, as the motor 50. Therefore, in the hybrid vehicle 1 provided with the internal-combustion engine 5 and the motor 50 as the prime movers, a technique capable of excellently performing the cranking of the internal-combustion engine 5 during the vehicle travel by transmitting the mechanical power from the motor 50 to the engine output shaft 8 while increasing the torque thereof is desired.

Figure 4:
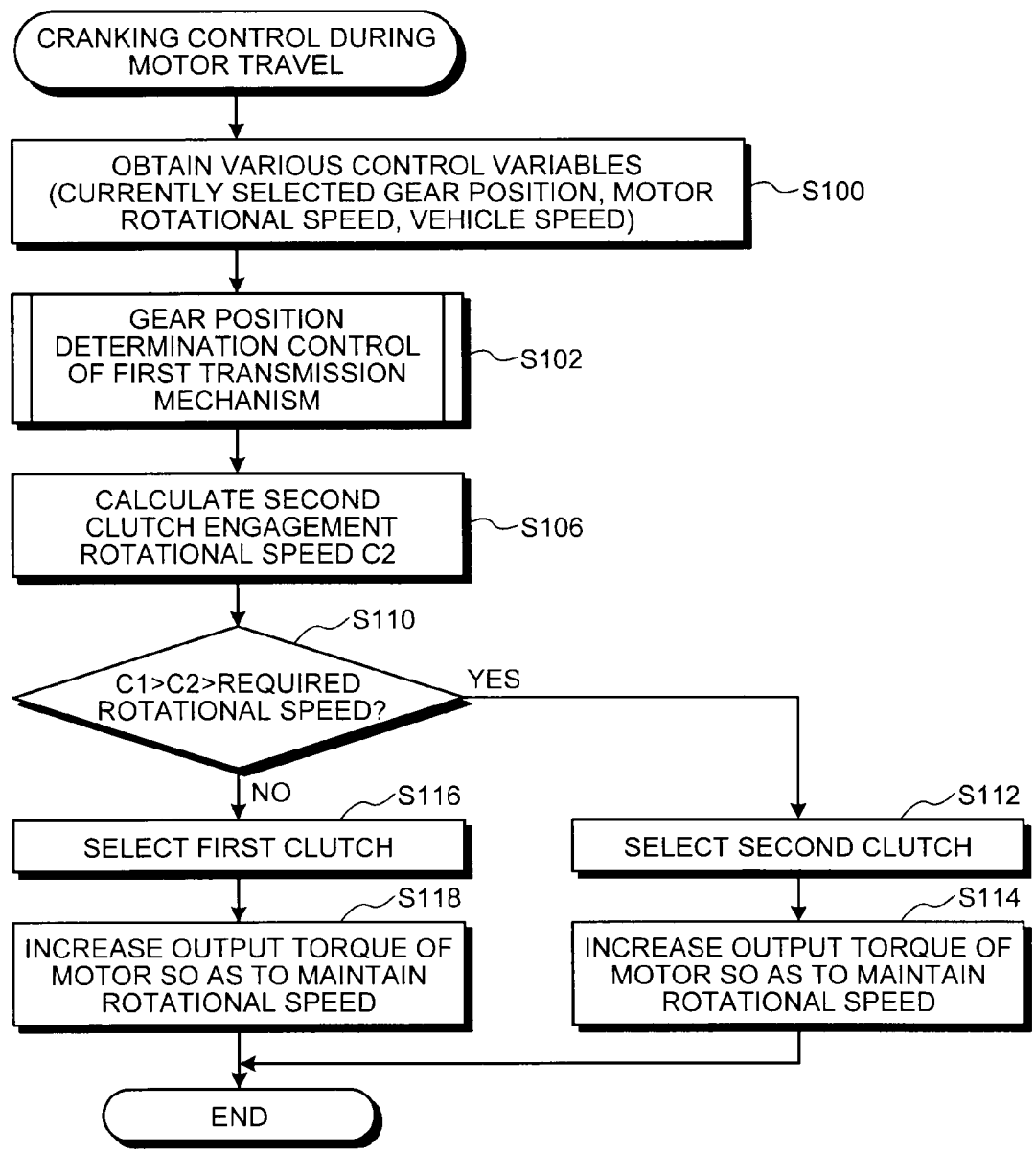
FIG. 4 is a flowchart showing cranking control during motor travel executed by controlling means (ECU) of the driving apparatus according to the first embodiment.
Figure 5:
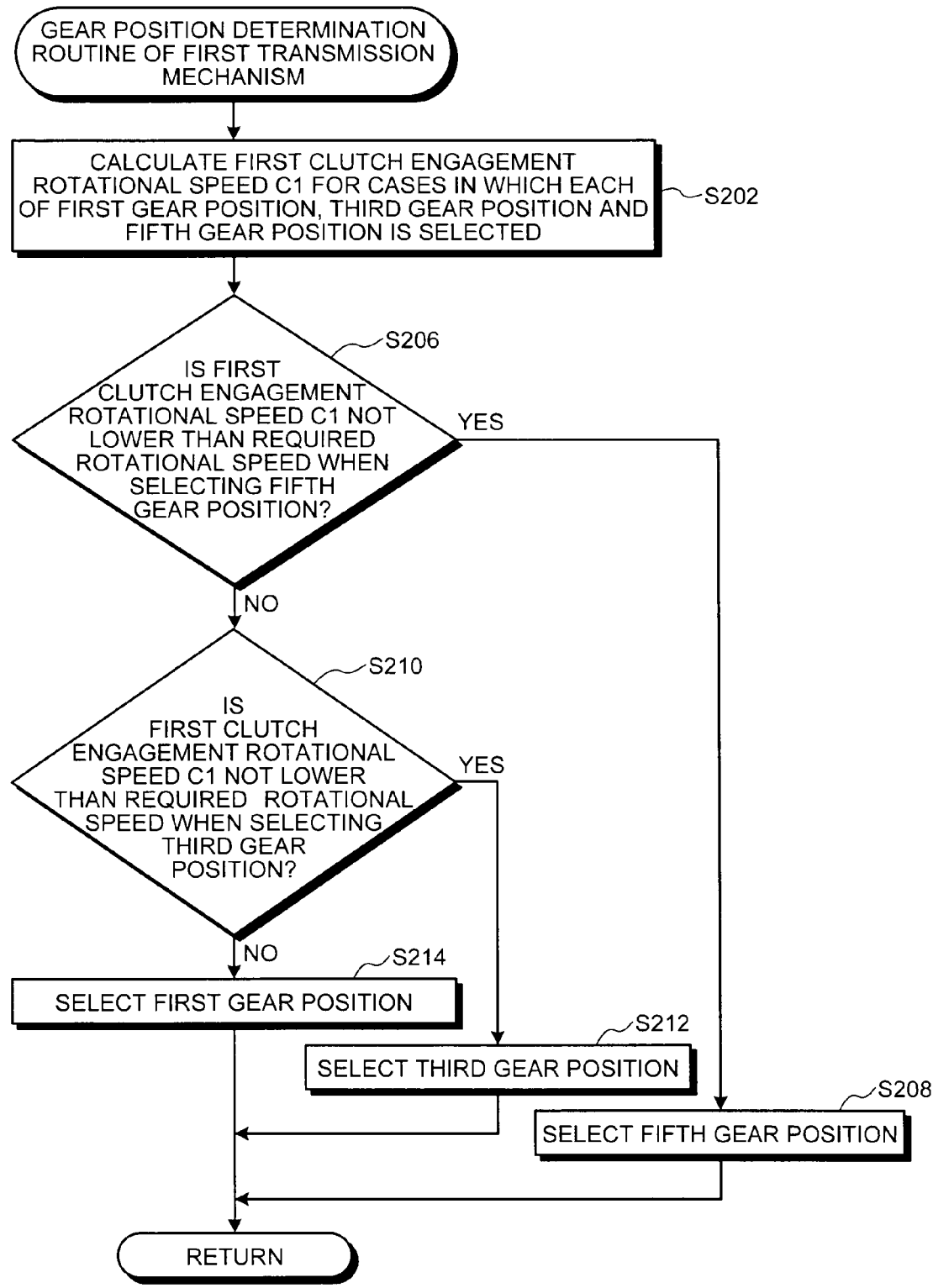
FIG. 5 is a flowchart showing a gear position determination routine for determining a gear position, which should be selected in a first transmission mechanism, in the cranking control during motor travel executed by the controlling means (ECU) of the driving apparatus according to the first embodiment.

Then, in the driving apparatus according to this embodiment, the ECU as the controlling means characteristically reduces the rotational speed of the mechanical power from the motor by the second and first transmission mechanisms and transmits the power from the first clutch to the engine output shaft, when performing the cranking of the internal-combustion engine during the vehicle travel. Hereinafter, a control process relating to the cranking of the internal-combustion engine executed by the ECU while the vehicle performs the motor travel (hereinafter, referred to as cranking control during motor travel) is described with reference to FIGS. 1, 4 and 5. FIG. 4 is a flowchart showing the cranking control during motor travel executed by the ECU. FIG. 5 is a flowchart showing a gear position determination routine to determine the gear position, which should be selected in the first transmission mechanism, in the cranking control during motor travel.

As shown in FIG. 1, first, during the motor travel of the vehicle 1, the driving apparatus 10 allows the motor 50 to perform the power running, and selects any one of the gear positions 42, 44 and 46 of the second transmission mechanism 40 to put the corresponding coupling mechanism 42e, 44e or 46e into the engaging state. The speed of the mechanical power output from the motor 50 to the second input shaft 28 is changed by any one of the gear positions of the second transmission mechanism 40 and the power is transmitted from the second output shaft 48 to the vehicle propeller shaft 66. Meanwhile, at that time, the ECU 100 controls both of the first and second clutches 21 and 22 in the release state, and the engine output shaft 8 stops moving.

Then, the ECU 100 executes the cranking control during motor travel to be described later, when judging that the cranking of the internal-combustion engine 5 is necessary, such as for starting the internal-combustion engine 5 and for ensuring the brake negative pressure, based on the storage state of the secondary battery 120, the brake negative pressure, or the accelerator operational amount detected as above.

As shown in FIG. 4, at a step S100, the ECU 100 obtains various control variables. The control variables include information relating to the gear position currently selected in the first and second transmission mechanism 30 and 40, the rotational speed of the driving wheels 88, or the rotational speed of the rotor 52 of the motor 50. Thereby, the ECU 100 comprehends the vehicle speed and the rotational speeds of the first and second input shafts 27 and 28.

Then, at a step S102, the ECU 100 executes the control process to determine the gear position, which should be selected in the first transmission mechanism 30 (hereinafter, simply referred to as a "gear position determination routine"). Hereinafter, the gear position determination control of the first transmission mechanism 30 is described with reference to FIG. 5.

First, at a step S202, in a case in which the fifth gear position 35 is selected, the rotational speed of the engine output shaft 8 of the internal-combustion engine 5 (engine rotational speed) when selecting the first clutch 21 to put into the engaging state is calculated. Similarly, the engine rotational speed when selecting the first clutch 21 to put into the engaging state is calculated also for a case in which the third gear position 33 is selected or in which the first gear position 31 is selected. Meanwhile, in a following description, an engine rotational speed C1 when selecting any one of the gear positions 31, 33 and 35 of the first transmission mechanism 30 and putting the first clutch 21 into the engaging state is referred to as a "first clutch engagement rotational speed".

Then, at a step S206, when selecting the fifth gear position 35, the ECU 100 judges whether the first clutch engagement rotational speed C1 is not lower than a required rotational speed set in advance. The required rotational speed is a lower limit value of the engine rotational speed required for starting the internal-combustion engine 5, and is set to 200 rpm, for example. That is to say, when performing the cranking by transmitting the mechanical power from the motor 50 from the first clutch 21 to the engine output shaft 8, the ECU 100 judges whether it is possible to ensure the required rotational speed by changing the speed of the mechanical power by the fifth gear position 35.

Meanwhile, the required rotational speed is obtained in advance by a specification of the internal-combustion engine 5, adjustment experimentation and the like, and is stored in a ROM (not shown) of the ECU 100 as a control constant. Meanwhile, when performing the cranking for ensuring the brake negative pressure, the required rotational speed may be set to 200 to 400 rpm unlike the case of performing the cranking for starting the internal-combustion engine 5.

When the first clutch engagement rotational speed C1 when selecting the fifth gear position 35 is judged to be not lower than the required rotational speed (Yes), when the mechanical power from the motor 50 is transmitted from the first clutch 21 to the engine output shaft 8, the ECU 100 judges that the speed of the engine output shaft 8 is not lower than the required rotational speed and the cranking may be performed at the rotational speed as low as possible if the speed of the mechanical power is changed by the fifth gear position 35 in the first transmission mechanism 30, and temporarily determines to select the fifth gear position 35 in the first transmission mechanism 30, at a step S208. The ECU 100 stores the first clutch engagement rotational speed C1 in a case in which the fifth gear position 35 is selected in a RAM (not shown). Then, the gear position determination routine of the first transmission mechanism 30 is terminated and the procedure returns to the step S102 of the cranking control during motor travel.

On the other hand, when it is judged that the first clutch engagement rotational speed C1 when selecting the fifth gear position 35 is selected is lower than the required rotational speed (No), the ECU 100 judges whether the first clutch engagement rotational speed C1 in a case in which the third gear position 33 is selected is not lower than the required rotational speed, at a step S210.

When it is judged that the first clutch engagement rotational speed C1 when selecting the third gear position 33 is not lower than the required rotational speed (Yes), when the mechanical power from the motor 50 is transmitted from the first clutch 21 to the engine output shaft 8, the ECU 100 judges that the speed of the engine output shaft 8 is not lower than the required rotational speed and the cranking may be performed at the rotational speed as low as possible if the speed of the mechanical power is changed by the third gear position 33 in the first transmission mechanism 30, and temporarily determines to select the third gear position 33 in the first transmission mechanism 30, at a step S212. The ECU 100 stores the first clutch engagement rotational speed C1 when the third gear position 33 is selected in the RAM (not shown). Then, the gear position determination control routine of the first transmission mechanism 30 is terminated and the procedure returns to the step S102 of the cranking control during motor travel.

On the other hand, when it is judged that the first clutch engagement rotational speed C1 when selecting the third gear position 33 is lower than the required rotational speed (No), when the mechanical power from the motor 50 is transmitted from the first clutch 21 to the engine output shaft 8, the ECU 100 judges that the speed of the engine output shaft 8 is not lower than the required rotational speed and the cranking may be performed at the speed as low as possible if the speed of the mechanical power is changed by the first gear position 31 in the first transmission mechanism 30, and temporarily determines to select the first gear position 31 in the first transmission mechanism 30, at a step S214. The ECU 100 stores the first clutch engagement rotational speed C1 when the first gear position is selected in the RAM (not shown). Then, the gear position determination routine of the first transmission mechanism 30 is terminated and the procedure returns to the step S102 of the cranking control during motor travel.

Then, at a step S106 of the cranking control during motor travel shown in FIG. 4, the ECU 100 calculates an engine rotational speed C2 in a case in which the second clutch 22 is put into the engaging state by the currently selected gear position out of the gear positions 42, 44 and 46 of the second transmission mechanism 40 (hereinafter, referred to as a second clutch engagement rotational speed).

Then, at a step S110, the ECU 100 judges whether the calculated second clutch engagement rotational speed C2 is higher than the required rotational speed and lower than the first clutch engagement rotational speed C1 of the gear position temporarily determined in the gear position determination routine of the first transmission mechanism 30. That is to say, this judges whether the cranking may be performed at the rotational speed not lower than the required rotational speed and lower than the first clutch engagement rotational C1, by transmitting the mechanical power output from the motor 50 to the second input shaft 28 directly from the second clutch 22 to the engine output shaft 8 rather than by changing the speed thereof by the second and first transmission mechanisms 40 and 30 and transmitting the torque from the first clutch 21 to the engine output shaft 8.

At the step S110, when it is judged that the second clutch engagement rotational speed C2 is higher than the required rotational speed and lower than the first clutch engagement rotational speed C1 of the gear position temporarily determined in the gear position determination routine of the first transmission mechanism 30 (Yes), the ECU 100 judges that the cranking can be performed at the rotational speed lower than the first clutch engagement rotational speed C1 by transmitting the mechanical power from the motor 50 from the second clutch 22 to the engine output shaft 8, and selects the second clutch 22 (S112). Specifically, the second clutch 22 is put into the engaging state and the first clutch 21 is put into the release state, and the mechanical power output from the motor 50 to the second input shaft 28 is directly transmitted from the second clutch 22 to the engine output shaft 8, thereby performing the cranking.

At that time, the ECU 100 increases the torque output from the motor 50 to the second input shaft 28 (hereinafter, referred to as the output torque) so as to maintain the rotational speed of the second input shaft 28, that is to say, the rotor 52 (S114). This may be realized by detecting the rotational speed of the second input shaft 28 or the rotor 52 and performing feedback control to increase the output torque of the motor 50 such that the rotational speed is constant.

Meanwhile, the increase of the output torque of the motor 50 may also be realized by obtaining the torque required for the cranking (hereinafter, referred to as cranking required torque) in advance for each rotational speed of the engine output shaft 8, and by putting the second clutch 22 into the engaging state and performing feed forward control to increase the output torque of the motor 50 by the torque required for cranking, by the ECU 100.

On the other hand, at the step S110, when it is judged that the second clutch engagement rotational speed C2 is not higher than the required rotational speed or not lower than the first clutch engagement rotational speed C1 of the gear position temporarily determined in the gear position determination routine of the first transmission mechanism 30, the ECU 100 judges that the cranking can be excellently performed by reducing the speed of the mechanical power from the motor 50 by the second and first transmission mechanisms 40 and 30 and transmitting the power from the first clutch 21 to the engine output shaft 8 rather than by transmitting the same from the second clutch 22 to the engine output shaft 8, and selects the first clutch 21 (S116). Specifically, this puts the first clutch 21 into the engaging state and puts the second clutch 22 into the release state to reduce the speed of the mechanical power output from the motor 50 to the second input shaft 28 by the second and first transmission mechanisms 40 and 30, and transmits the power from the first clutch 21 to the engine output shaft 8, thereby performing the cranking. At that time, the speed of the output torque of the motor 50 is reduced by the second and first transmission mechanisms 40 and 30 and the torque is increased, and is transmitted to the engine output shaft 8.

At that time, the ECU 100 increases the output torque to be output from the motor 50 to the second input shaft 28 so as to maintain the rotational speed of the second input shaft 28 as at the step S114 (S118). This can be realized by detecting the rotational speed of the second input shaft 28 or the rotor 52 to perform the feedback control to increase the output torque of the motor 50 such that the rotational speed is constant.

In this manner, the driving apparatus 10 may reduce the speed of the mechanical power from the motor 50 by the second and first transmission mechanisms 40 and 30, without changing the rotational speed of the second input shaft 28, that is to say, the rotational speed of the vehicle propeller shaft 66 and the driving wheels 88 engaging therewith, and increase the output torque of the motor 50 to transmit from the first clutch 21 to the engine output shaft 8, thereby performing the cranking. The output torque of the motor 50 is increased by the second and first transmission mechanisms 40 and 30 and is transmitted to the engine output shaft 8, so that the motor 50 can excellently perform the cranking of the internal-combustion engine 5 with smaller output torque than in a case of transmitting the output torque from the second clutch 22 to the engine output shaft 8.

As described above, this embodiment has the first transmission mechanism 30 capable of receiving the mechanical power from the engine output shaft 8 by the first input shaft 27 and changing the speed thereof by any one of a plurality of gear positions 31, 33, 35 and 39 to transmit to the vehicle propeller shaft 66, the second transmission mechanism 40 capable of receiving the mechanical power from the engine output shaft 8 and the motor 50 by the second input shaft 28 and changing the speed thereof by any one of a plurality of the gear positions 42, 44 and 46 to transmit to the vehicle propeller shaft 66, the first clutch 21 capable of engaging the engine output shaft 8 with the first input shaft 27, the second clutch 22 capable of engaging the engine output shaft 8 with the second input shaft 28, and the ECU 100 as the controlling means capable of controlling the selection of the gear position in the first and second transmission mechanisms 30 and 40 and the selection of the first or second clutches 21 or 22.

When performing the cranking of the internal-combustion engine 5, the ECU 100 selects the gear position of the first and second transmission mechanisms 30 and 40 so as to reduce the speed of the mechanical power received by the second input shaft 28 and transmits the power to the first input shaft 27, and puts the first clutch 21 into the engaging state. This reduces the speed of the mechanical power output from the motor 50 to the second input shaft 27 by the second and first transmission mechanisms 40 and 30 and increases the torque to transmit from the first input shaft 27 to the engine output shaft 8 through the first clutch 21. Thereby, it is possible to increase the output torque of the motor 50 provided as the prime mover to rotation-drive the engine output shaft 8, and to excellently perform the cranking of the internal-combustion engine 5 while preventing the output torque of the motor 50.

Also, in this embodiment, the ECU 100 is configured to select the gear position of the first transmission mechanism 30 such that the engine rotational speed when performing the cranking is not lower than the required rotational speed set in advance and is the lowest. By selecting the gear position such that the speed is not lower than the required rotational speed set for starting the internal-combustion engine 5 and ensuring the brake negative pressure (for example, 200 rpm) and is the lowest, it is possible to excellently perform the cranking for starting the internal-combustion engine 5 and ensuring the brake negative pressure while preventing the output torque of the motor 50 as much as possible.

Also, in this embodiment, for cases in which each of the gear positions 31, 33 and 35 of the first transmission mechanism 30 is selected, the ECU 100 has first clutch engagement rotational speed estimating means (S202) for estimating the first clutch engagement rotational speed C1, which is the engine rotational speed in a case in which the first clutch 21 is put into the engaging state, rotational speed judging means (S206, S210) for judging whether the first clutch engagement rotational speed C1 is higher than the required rotational speed set in advance, and gear position selecting means (S208, S212, S214) for selecting the gear position, which is the base of calculating the first clutch engagement rotational speed C1 in the first transmission mechanism 30 when the first clutch engagement rotational speed C1 is higher than the required rotational speed. The rotational speed judging means of the ECU 100 judges whether the first clutch engagement rotational speed C1 is higher than the required rotational speed for the highest speed position 35, which is the highest speed gear position of the highest speed, and when it is determined to be not higher than the required rotational speed, this judges for the gear positions 33 and 31, which are lower than the highest speed position 35.

In the first transmission mechanism 30, it is possible to efficiently realize the selection of the gear position of the first transmission mechanism 30 such that the engine rotational speed when performing the cranking is not lower than the required rotational speed set in advance and is the lowest.

Also, in this embodiment, the ECU 100 has second clutch engagement rotational speed estimating means (S106) for estimating the second clutch engagement rotational speed C2, which is the engine rotational speed when the second clutch 22 is put into the engaging state, and is configured to engage the second clutch 22 to transmit the mechanical power from the motor 50 from the second clutch 22 to the internal-combustion engine 5 when the second clutch engagement rotational speed C2 is higher than the required rotational speed and is lower than the first clutch engagement rotational speed C1.

When the cranking may be performed at the rotational speed lower than the first clutch engagement rotational speed C1 and not lower than the required rotational speed by transmitting the mechanical power output to the second input shaft 28 directly from the second clutch 22 to the engine output shaft 8 rather than by changing the speed of the mechanical power output from the motor 50 to the second input shaft 28 by the second and first transmission mechanisms 40 and 30 and transmitting the power from the first clutch 21 to the mechanical output shaft 8, the cranking can be excellently performed by transmitting the mechanical power output from the motor 50 to the second input shaft 28 directly from the second clutch 22 to the engine output shaft 8, rather than by selecting the first clutch 21.

Second Embodiment

Figure 6:
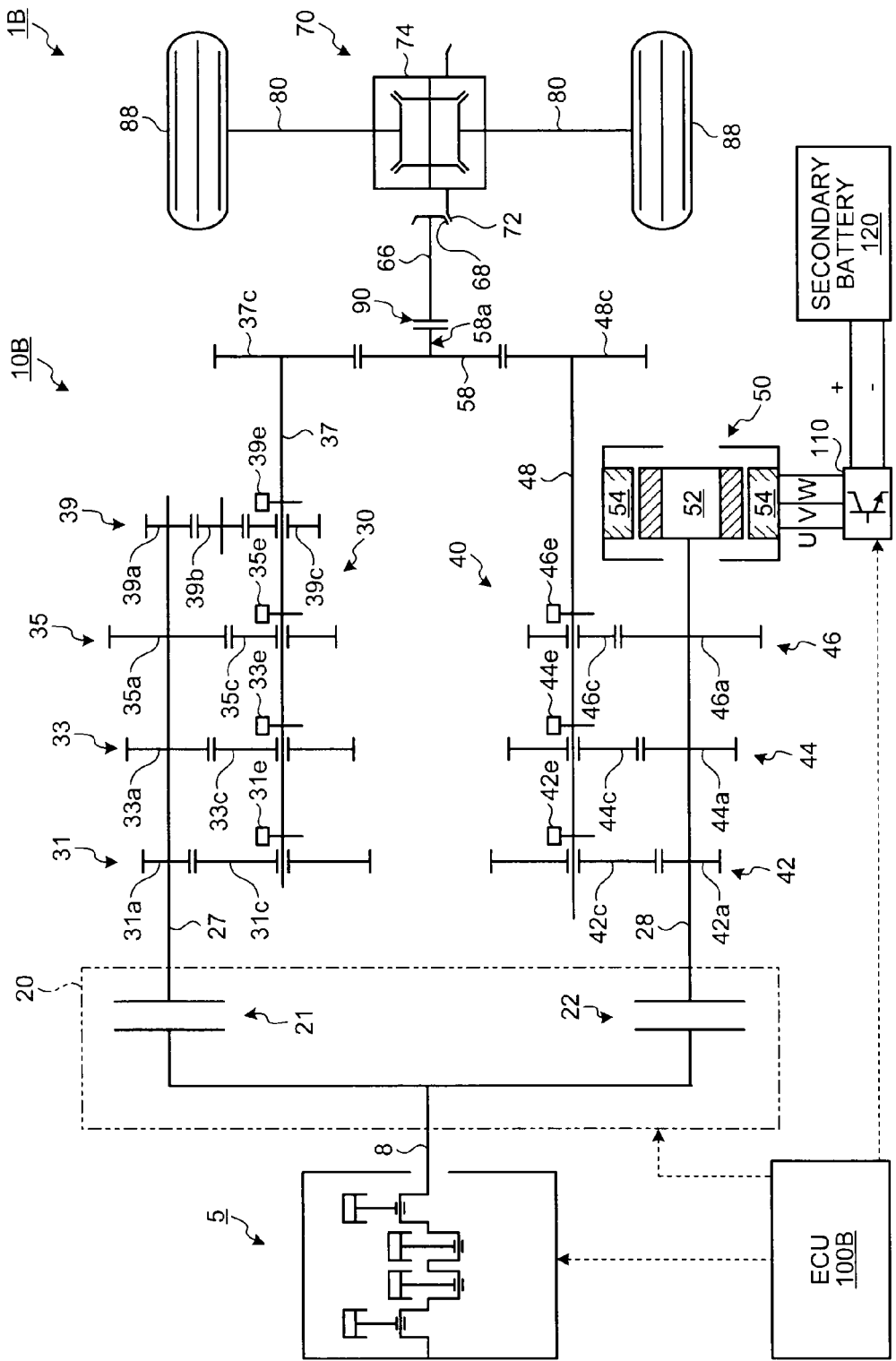
FIG. 6 is a schematic diagram showing a schematic configuration of the vehicle provided with the driving apparatus according to a second embodiment.
Figure 7:
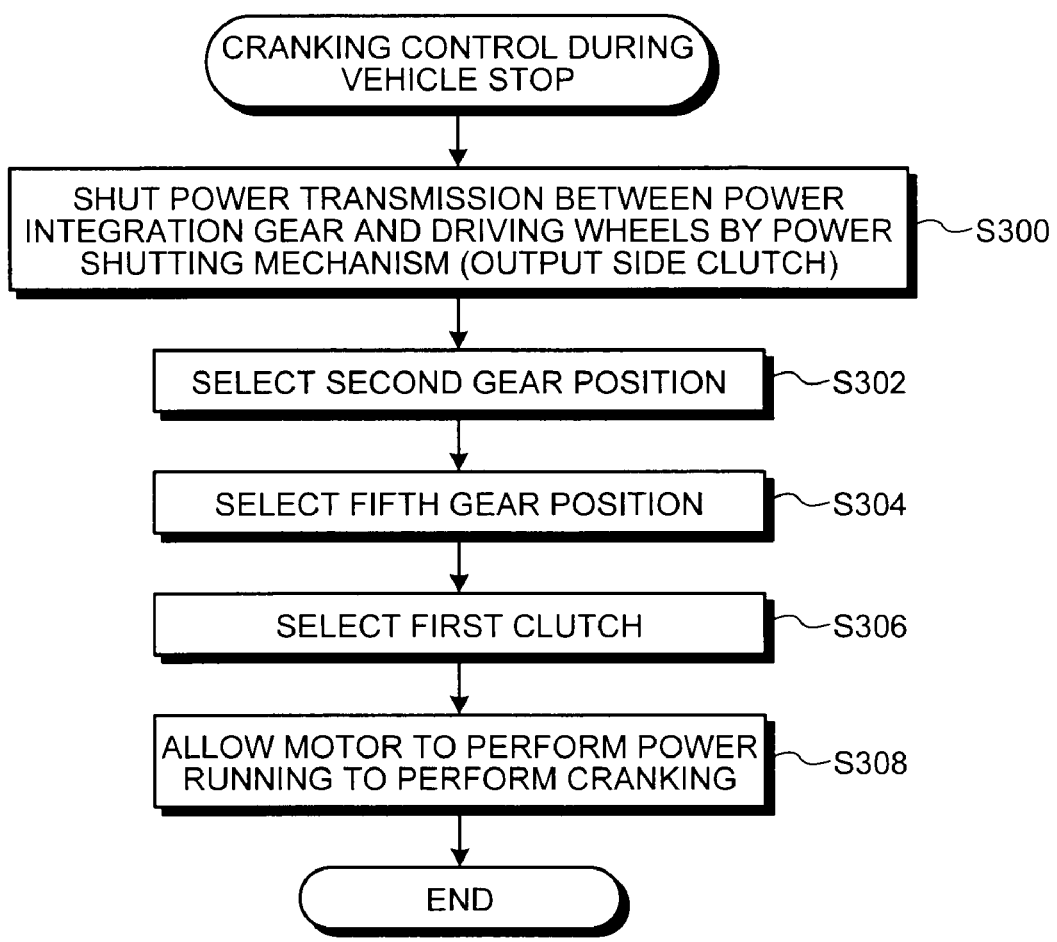
FIG. 7 is a flowchart showing cranking control during vehicle stop executed by the controlling means (ECU) of the driving apparatus according to the second embodiment.

A configuration of the driving apparatus according to this embodiment is described with reference to FIGS. 6 to 8. FIG. 6 is a schematic diagram showing a schematic configuration of the vehicle provided with the driving apparatus. FIG. 7 is a flowchart showing cranking control during vehicle stop executed by the ECU. FIG. 8 is a schematic diagram showing a schematic configuration of the vehicle provided with the driving apparatus having a power shutting mechanism of another aspect. The driving apparatus according to this embodiment has a power integration gear, which is the power integration mechanism capable of integrating the mechanical power from the first and second transmission mechanisms to transmit to the vehicle propeller shaft, and the power shutting mechanism capable of shutting the transmission of the mechanical power between the power integration gear and the driving wheels, and the ECU as the controlling means is different from that of the first embodiment in that this puts the power shutting mechanism into a shutting state to shut the transmission of the mechanical power between the power integration mechanism and the driving wheels when performing the cranking of the internal-combustion engine during the vehicle stop, and this is described in detail hereinafter. Meanwhile, the identical reference numeral is given to the configuration substantially common to that of the first embodiment and the description thereof is omitted.

As shown in FIG. 6, in a driving apparatus 10B, the power integration gear 58 meshes with the first propeller shaft drive gear 37c coupled to the first output shaft 37 of the first transmission mechanism 30 and the second propeller shaft drive gear 48c coupled to the second output shaft 48 of the second transmission mechanism 40. A driving apparatus output shaft 58a is coupled to the power integration gear 58. The driving apparatus 10B is capable of integrating the mechanical power output from the first and second output shafts 37 and 48 by the power integration gear 58 to output from the driving apparatus output shaft 58c to the vehicle propeller shaft 66.

A clutch mechanism 90 (hereinafter, referred to as an output side clutch) capable of engaging the driving apparatus output shaft 58 with the vehicle propeller shaft 66 is provided as the power shutting mechanism capable of shutting the transmission of the mechanical power between the power integration gear 58 of the driving apparatus 10B and the driving wheels 88 between the driving apparatus output shaft 58c and the vehicle propeller shaft 66. Meanwhile, the output side clutch 90 can be composed of an optional clutch mechanism such as the disk-shaped friction clutch. Switching of the engaging state and the non-engaging state (release state) of the output side clutch 90 is controlled by an ECU 100B through an actuator not shown or the like.

When the ECU 100B puts the output side clutch 90 into the release state to shut the transmission of the mechanical power between the power integration gear 58 and the driving wheels 88, the driving apparatus 10B can allow the motor 50 to perform the power running to change the speed of the mechanical power output from the motor 50 to the second input shaft 28 by the second and first transmission mechanisms 40 and 30, and transmitting the power from the first clutch 21 to the engine output shaft 8, thereby performing the cranking, even in a state in which the driving wheels 88 stop moving, that is to say, when a vehicle 1B stops (hereinafter, referred to as during vehicle stop). Meanwhile, it is also possible to perform the cranking by transmitting the mechanical power output from the motor 50 to the second input shaft 28 directly from the second clutch 22 to the engine output shaft 8.

In the vehicle 1B thus configured, the ECB 100 executes a following cranking control process during vehicle stop (hereinafter, referred to as cranking control during vehicle stop) when judging that the start of the internal-combustion engine 5 is necessary during the vehicle stop such as when the storage state (SOC) of the secondary battery 120 decreases to be equal to or lower than a predetermined value and that the cranking of the internal-combustion engine 5 is necessary during the vehicle stop such as for ensuring the brake negative pressure.

As shown FIG. 7, at a step S300, the ECU 100B puts the output side clutch 90 as the power shutting mechanism into the release state to shut the transmission of the mechanical power between the power integration gear 58 of the driving apparatus 10B and the driving wheels 88. This makes it possible to allow the power integration gear 58 and the first and second output shafts 37 and 48 engaging therewith to rotate regardless of stop and rotation of the driving wheels 88.

Then, at a step S302, the ECU 100B selects the second gear position 42, which is the lowest speed gear position out of the gear positions 42, 44 and 46 of the second transmission mechanism 40, and puts the corresponding second coupling mechanism 42e into the engaging state. This makes it possible to reduce the rotational speed of the mechanical power output from the motor 50 to the second input shaft 28 as much as possible and transmit the power to the second output shaft 48.

Therewith, at a step S304, the ECU 100B selects the fifth gear position 35, which is the highest speed gear position out of the gear positions 31, 33 and 35 of the first transmission mechanism 30, and puts the corresponding fifth coupling mechanism 35e into the engaging state. This makes it possible to reduce the rotational speed of the mechanical power transmitted from the motor 50 to the first output shaft 37 through the second output shaft 48, the second propeller shaft drive gear 48c, the power integration gear 58 and the first propeller shaft drive gear 37c as much as possible and transmit the power to the first input shaft 27.

Therewith, at a step S306, the ECU 100B selects the first clutch 21 to put the first clutch 21 into the engaging state and put the second clutch 22 into the release state. This makes it possible to transmit the mechanical power transmitted from the motor 50 to the first input shaft 27 from the first clutch 21 to the mechanical output shaft 8.

Then, at a step S308, the ECU 100B allows the motor 50 to perform the power running, thereby reducing the rotational speed of the mechanical power output from the motor 50 to the second input shaft 28 by the second gear position 42 of the second transmission mechanism 40 and the fifth gear position 35 of the first transmission mechanism 30 to increase the torque and transmitting the power from the first clutch 21 to the engine output shaft 8. This makes it possible that the driving apparatus 10B performs the cranking by transmitting the mechanical power from the motor 50 to the engine output shaft 8 while increasing the torque thereof by the first and second transmission mechanisms 30 and 40 even during the vehicle stop.

After that, the ECU 100B may start the internal-combustion engine 5 by performing the firing. Thereby, during the vehicle stop, the driving apparatus 10B may transmit the mechanical power output by the started internal-combustion engine 5 from the engine output shaft 8 to the rotor 52 to supply to the motor 50 or power generation, thereby charging the secondary battery 120. Also, the driving apparatus 10B may generate the brake negative pressure by continuing the cranking of the internal-combustion engine 5 for a predetermined time period without performing the firing.

Meanwhile, although the output side clutch 90, which is the clutch mechanism capable of engaging the driving apparatus output shaft 58a with the vehicle propeller shaft 66, is provided as the power shutting mechanism capable of shutting the transmission of the mechanical power between the power integration gear 58 as the power integration mechanism and the driving wheels 88 in this embodiment, an aspect of the power shutting mechanism is not limited to this.

As the power shutting mechanism, for example, as shown in FIG. 8, the output side coupling mechanism 58e capable of engaging the power integration gear 58 capable of integrating the mechanical power from the first and second output shafts 37 and 48 and the vehicle propeller shaft 66 is provided, and it is configured that the engaging state and the release state of the output side coupling mechanism 58e is controllable by the ECU 100B. Thus configured, as in the case of providing the above-described output side clutch 90, the power shutting mechanism capable of shutting the transmission of the mechanical power between the power integration mechanism (power integration gear) and the driving wheels 88 can be realized.

As described above, this embodiment has the power integration gear 58 as the power integration mechanism capable of integrating the mechanical power from the first and second transmission mechanisms 30 and 40 to transmit to the vehicle propeller shaft 66, and the power shutting mechanism (90; 58e) capable of shutting the transmission of the mechanical power between the power integration gear (58; 58c) and the driving wheels 88, and the ECU 100B is configured to control the power shutting mechanism (90; 58e) to shut the transmission of the mechanical power between the power integration gear 58 and the driving wheels 88 when performing the cranking of the internal-combustion engine 5 during the vehicle stop. Thereby, the driving apparatus 10B can perform the cranking of the internal-combustion engine 5 during the vehicle stop without transmitting the mechanical power from the motor 50 to the driving wheels 88 to allow the vehicle to travel.

Also, in this embodiment, the ECU 100B is configured to select the second gear position 42, which is the lowest speed gear position out of the gear positions 42, 44 and 46 of the second transmission mechanism 40, and select the fifth gear position 35, which is the highest speed gear position out of the gear positions 31, 33 and 35 of the first transmission mechanism 30, so that it is possible to reduce the rotational speed of the mechanical power output from the motor 50 to the second input shaft 28 to increase the torque as much as possible in both of the second and first transmission mechanisms 40 and 30 and to transmit the power from the first clutch 21 to the engine output shaft 8, and the cranking can be excellently performed for starting the internal-combustion engine 5 and ensuring the brake negative pressure while minimizing the output torque of the motor 50.

Also, in this embodiment, the power shutting mechanism is the output side clutch 90, which is the clutch mechanism capable of engaging the driving apparatus output shaft 58a coupled to the power integration gear 58 and the vehicle propeller shaft 66, so that the power shutting mechanisms capable of shutting the transmission of the mechanical power between the power integration mechanism for integrating the mechanical power from the second and first transmission mechanisms and the driving wheels may be realized by the clutch mechanism.

Also, the power shutting mechanism is the output side coupling mechanism 58e capable of engaging the power integration gear 58c, which is the power integration mechanism, and the vehicle propeller shaft 66 in this embodiment, so that the power shutting mechanism capable of shutting the transmission of the mechanical power between the power integration mechanism for integrating the mechanical power from the second and first transmission mechanisms and the driving wheels can be realized by the coupling mechanism for coupling the shaft (shaft) for transmitting the power and the gear provided so as to be rotatable around the shaft.

Meanwhile, although the driving apparatus (10; 10B) integrates the mechanical power from the internal-combustion engine 5 and the motor 50 to transmit to the vehicle propeller shaft 66 in the embodiments, an aspect of the vehicle propeller shaft according to this embodiment is not limited to this. The driving apparatus capable of transmitting the mechanical power to the vehicle propeller shaft engaging with the driving wheels may be used, and it is also possible that the driving apparatus integrates the mechanical power from the internal-combustion engine and the motor to directly transmit to the drive shaft (drive shaft), which is the vehicle propeller shaft rotating at the same rotational speed with the driving wheels, for example.

Also, although the motor 50 provided on the driving apparatus (10; 10B) as the prime mover is the motor generator obtained by combining the function as the electric motor for converting the supplied electric power into the mechanical power to output and the function as the electric generator for converting the input mechanical power to the electric power in the embodiments, the motor according to the present invention is not limited to this. The motor capable of outputting the mechanical power to the input shaft of the transmission mechanism may be used, and for example, the motor may be configured as the electric motor having only the function to convert the electric power into the mechanical power to output.

Also, although in the driving apparatus (10; 10B), the first transmission mechanism 30 transmits the mechanical power received by the first input shaft 27 from the first output shaft 37 to the vehicle propeller shaft 66 engaging with the driving wheels 88 and the second transmission mechanism 40 transmits the mechanical power received by the second input shaft 28 from the second output shaft 48 to the vehicle propeller shaft 66 in the embodiments, an aspect of the first and second transmission mechanisms is not limited to this. The first and second transmission mechanisms capable of transmitting the mechanical power received by each input shaft to the driving wheels may be used, and for example, it is also possible that each gear position of the first and second transmission mechanisms may transmit the mechanical power received by the first and second input shafts, respectively, to the common output shaft engaging with the driving wheels.

Also, although the driving apparatus (10; 10B) is configured to convert the mechanical power from the engine output shaft 8 of the internal-combustion 5 and the rotor 52 of the electric motor 50 at least one of the first and second transmission mechanisms 30 and 40 and transmit the power from the power integration gear 58 to the driving wheels 88 through the propeller shaft 66 and the differential mechanism 74 of the final reduction gear 70 in the embodiments, an aspect of the power transmission from the first and second transmission mechanisms to the driving wheels is not limited to this. In the driving apparatus, the first and second transmission mechanisms capable of transmitting the mechanical power received by each input shaft to the driving wheels may be used, and for example, the power integration gear or the drive gear meshing with the power integration gear may directly meshes with the ring gear of the differential mechanism.

Industrial Applicability

As described above, the driving apparatus according to the embodiments is useful in the hybrid vehicle provided with the internal-combustion engine and the motor as the prime movers, and is especially useful in the vehicle provided with the dual clutch transmission.

The invention claimed is:

1. A driving apparatus for a vehicle used in a vehicle provided with an internal-combustion engine and a motor as prime movers and is capable of changing speed of mechanical power from the internal-combustion engine and the motor by a transmission mechanism and transmitting the power to a vehicle propeller shaft engaging with a driving wheel, the driving apparatus comprising:
    a first transmission mechanism capable of receiving the mechanical power from an engine output shaft by a first input shaft to change the speed by any one of a plurality of gear positions and transmitting the power to the vehicle propeller shaft;
    a second transmission mechanism capable of receiving the mechanical power from the engine output shaft and the motor by a second input shaft to change the speed by any one of a plurality of gear positions and transmitting the power to the vehicle propeller shaft;
    a first clutch capable of engaging the engine output shaft with the first input shaft;
    a second clutch capable of engaging the engine output shaft with the second input shaft; and
    a controlling unit capable of controlling a selection of the gear position in the first transmission mechanism and the second transmission mechanism and an engaging state of the first clutch and the second clutch, wherein
    the controlling unit selects the gear position of the first transmission mechanism and the second transmission mechanism so as to reduce the speed of the mechanical power received by the second input shaft and transmit the power to the first input shaft, and when putting the first clutch into an engaging state, the controlling unit selects the gear position of the first transmission mechanism such that an engine rotational speed when performing the cranking is not lower than a required rotational speed set in advance and is the lowest, when performing cranking of the internal-combustion engine during a motor travel which is a vehicle travel using only the motor as the prime mover.

2. The driving apparatus for a vehicle according to claim 1, wherein
    the controlling unit includes
    a first-clutch engagement rotational speed estimating unit capable of estimating a first clutch engagement rotational speed which is the engine rotational speed when the first clutch is put into the engaging state, for cases in which each of the gear positions of the first transmission mechanism is selected,
    a rotational speed judging unit that judges whether the first clutch engagement rotational speed is higher than the required rotational speed set in advance, and
    a gear position selecting unit that selects a gear position which is a base of calculation of the first clutch engagement rotational speed in the first transmission mechanism, when the first clutch engagement rotational speed is higher than the required rotational speed, and wherein
    the rotational speed judging unit judges whether the first clutch engagement rotational speed is higher than the required rotational speed for a highest speed position which is a highest speed gear position, and judges for a gear position lower than the highest speed position when it is judged to be not higher than the required rotational speed.

3. The driving apparatus for a vehicle according to claim 2, wherein
    the controlling unit includes
    a second clutch engagement rotational speed estimating unit that estimates a second clutch engagement rotational speed which is the engine rotational speed when the second clutch is put into the engaging state, and
    the controlling unit puts the second clutch into the engaging state to transmit the mechanical power from the motor from the second clutch to the internal-combustion engine, when the second clutch engagement rotational speed is higher than the required rotational speed and lower than the first clutch engagement rotational speed.

4. The driving apparatus for a vehicle according to claim 1, further comprising:
    a power integration mechanism capable of integrating the mechanical power from the second transmission mechanism and the first transmission mechanism to transmit to the vehicle propeller shaft; and
    a power shutting mechanism capable of shutting transmission of the mechanical power between the power integration mechanism and the driving wheel, wherein
    the controlling unit controls the power shutting mechanism to shut the transmission of the mechanical power between the power integration mechanism and the driving wheel, when performing the cranking of the internal-combustion engine during vehicle stop.

5. The driving apparatus for a vehicle according to claim 4, wherein
    the controlling unit selects a lowest speed gear position out of the gear positions of the second transmission mechanism, and selects a highest speed gear position out of the gear positions of the first transmission mechanism.

6. The driving apparatus for a vehicle according to claim 5, wherein the power shutting mechanism is a clutch mechanism capable of engaging a driving apparatus output shaft coupled to the power integration mechanism with the vehicle propeller shaft.

7. The driving apparatus for a vehicle according to claim 5, wherein the power shutting mechanism is a coupling mechanism capable of engaging the power integration mechanism with the vehicle propeller shaft.

8. The driving apparatus for a vehicle according to claim 4, wherein the power shutting mechanism is a clutch mechanism capable of engaging a driving apparatus output shaft coupled to the power integration mechanism with the vehicle propeller shaft.

9. The driving apparatus for a vehicle according to claim 4, wherein the power shutting mechanism is a coupling mechanism capable of engaging the power integration mechanism with the vehicle propeller shaft.

* * * * *